(12) United States Patent
Agiwal et al.

(10) Patent No.: US 11,672,017 B2
(45) Date of Patent: Jun. 6, 2023

(54) METHOD AND APPARATUS FOR PERFORMING COMMUNICATION IN WIRELESS COMMUNICATION SYSTEM

(71) Applicant: Samsung Electronics Co., Ltd., Suwon-si (KR)

(72) Inventors: Anil Agiwal, Suwon-si (KR); Jaehyuk Jang, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 9 days.

(21) Appl. No.: 17/165,117

(22) Filed: Feb. 2, 2021

(65) Prior Publication Data

US 2021/0243812 A1  Aug. 5, 2021

Related U.S. Application Data

(60) Provisional application No. 62/969,335, filed on Feb. 3, 2020.

(51) Int. Cl.
*H04W 74/08* (2009.01)
*H04W 72/04* (2009.01)
*H04L 5/00* (2006.01)

(52) U.S. Cl.
CPC ........ *H04W 74/0833* (2013.01); *H04L 5/0048* (2013.01); *H04W 72/0413* (2013.01)

(58) Field of Classification Search
CPC ........... H04W 74/0833; H04W 74/008; H04W 72/0413; H04L 5/0048
See application file for complete search history.

(56) References Cited

U.S. PATENT DOCUMENTS

| 10,931,497 B2 | 2/2021 | Sheng et al. |
| 2019/0297547 A1 | 9/2019 | Tsai et al. |

(Continued)

FOREIGN PATENT DOCUMENTS

| KR | 10-2020-0003197 A | 1/2020 |
| KR | 10-2020-0003853 A | 1/2020 |

OTHER PUBLICATIONS

International Search Report dated May 4, 2021, issued in an International Application No. PCT/KR2021/001372.

(Continued)

*Primary Examiner* — Redentor Pasia
(74) *Attorney, Agent, or Firm* — Jefferson IP Law, LLP

(57) ABSTRACT

A method and an apparatus for performing communication in wireless communication system are provided. The method includes receiving random access channel (RACH) configuration information from a base station (BS), in case that a type of a random access is identified as 2-step contention free based on the RACH configuration information, selecting a synchronization signal block (SSB) with synchronization signal-reference signal received power (SS-RSRP) above a configured threshold among SSBs, identifying a random access occasion corresponding to the selected SSB, identifying a physical uplink shared channel (PUSCH) occasion corresponding to a RACH slot of the selected random access occasion from PUSCH occasions configured based on PUSCH resource configuration information included in the RACH configuration information, and performing msgA transmission based on the identified random access occasion and the identified PUSCH occasion.

20 Claims, 11 Drawing Sheets

(56) References Cited

U.S. PATENT DOCUMENTS

| | | | |
|---|---|---|---|
| 2020/0100299 A1* | 3/2020 | Loehr | H04W 80/02 |
| 2020/0169340 A1 | 5/2020 | Hwang et al. | |
| 2020/0267773 A1* | 8/2020 | Islam | H04W 80/02 |
| 2020/0383167 A1* | 12/2020 | Sengupta | H04W 72/0413 |
| 2021/0022143 A1* | 1/2021 | Xiong | H04L 5/0051 |
| 2021/0126698 A1* | 4/2021 | Tsai | H04B 17/318 |
| 2021/0168874 A1* | 6/2021 | Wei | H04W 74/0833 |
| 2021/0227587 A1* | 7/2021 | Tsai | H04W 72/0413 |
| 2021/0243816 A1* | 8/2021 | Taherzadeh Boroujeni | H04L 1/0072 |
| 2021/0352713 A1* | 11/2021 | Wu | H04L 5/0044 |
| 2022/0053576 A1* | 2/2022 | Lu | H04W 74/0833 |
| 2022/0132583 A1* | 4/2022 | Ko | H04W 74/0833 |
| 2022/0132595 A1* | 4/2022 | Ko | H04W 72/0453 |
| 2022/0174752 A1* | 6/2022 | Xing | H04W 74/0841 |

OTHER PUBLICATIONS

ZTE; FL Summary #1 of Procedure for 2-step RACH; 3GPP TSG RAN WG1 #99; R1-1913266; Nov. 25, 2019, Reno, USA.

Nokia, Nokia Shanghai Bell; Feature lead summary#1 on 2 step RACH procedures; 3GPP TSG RAN WG1 #98bis; R1-1910693; Oct. 22, 2019, Chongqing, China.

* cited by examiner

METHOD AND APPARATUS FOR PERFORMING COMMUNICATION IN WIRELESS COMMUNICATION SYSTEM

CROSS-REFERENCE TO RELATED APPLICATION(S)

This application is based on and claims priority under 35 U.S.C. § 119(e) of a U.S. Provisional application Ser. No. 62/969,335, filed on Feb. 3, 2020, in the U.S. Patent and Trademark Office, the disclosure of which is incorporated by reference herein in its entirety.

BACKGROUND

1. Field

The disclosure relates to wireless communication systems. More particularly, the disclosure relates to methods and apparatuses for performing a random access procedure.

2. Description of Related Art

Considering the development of wireless communication from generation to generation, the technologies have been developed mainly for services targeting humans, such as voice calls, multimedia services, and data services. Following the commercialization of 5th-generation (5G) communication systems, it is expected that the number of connected devices will exponentially grow. Increasingly, these will be connected to communication networks. Examples of connected things may include vehicles, robots, drones, home appliances, displays, smart sensors connected to various infrastructures, construction machines, and factory equipment. Mobile devices are expected to evolve in various form-factors, such as augmented reality glasses, virtual reality headsets, and hologram devices. In order to provide various services by connecting hundreds of billions of devices and things in the 6th-generation (6G) era, there have been ongoing efforts to develop improved 6G communication systems. For these reasons, 6G communication systems are referred to as beyond-5G systems.

6G communication systems, which are expected to be commercialized around 2030, will have a peak data rate of tera (1,000 giga)-level bps and a radio latency less than 100 μsec, and thus will be 50 times as fast as 5G communication systems and have the 1/10 radio latency thereof.

In order to accomplish such a high data rate and an ultra-low latency, it has been considered to implement 6G communication systems in a terahertz band (for example, 95 gigahertz (GHz) to 3 terahertz (THz) bands). It is expected that, due to severer path loss and atmospheric absorption in the terahertz bands than those in mmWave bands introduced in 5G, technologies capable of securing the signal transmission distance (that is, coverage) will become more crucial. It is necessary to develop, as major technologies for securing the coverage, radio frequency (RF) elements, antennas, novel waveforms having a better coverage than orthogonal frequency division multiplexing (OFDM), beamforming and massive multiple input multiple output (MIMO), full dimensional MIMO (FD-MIMO), array antennas, and multiantenna transmission technologies such as large-scale antennas. In addition, there has been ongoing discussion on new technologies for improving the coverage of terahertz-band signals, such as metamaterial-based lenses and antennas, orbital angular momentum (OAM), and reconfigurable intelligent surface (RIS).

Moreover, in order to improve the spectral efficiency and the overall network performances, the following technologies have been developed for 6G communication systems: a full-duplex technology for enabling an uplink transmission and a downlink transmission to simultaneously use the same frequency resource at the same time, a network technology for utilizing satellites, high-altitude platform stations (HAPS), and the like in an integrated manner, an improved network structure for supporting mobile base stations and the like and enabling network operation optimization and automation and the like, a dynamic spectrum sharing technology via collision avoidance based on a prediction of spectrum usage, an use of artificial intelligence (AI) in wireless communication for improvement of overall network operation by utilizing AI from a designing phase for developing 6G and internalizing end-to-end AI support functions, and a next-generation distributed computing technology for overcoming the limit of UE computing ability through reachable super-high-performance communication and computing resources (such as mobile edge computing (MEC), clouds, and the like) over the network. In addition, through designing new protocols to be used in 6G communication systems, developing mechanisms for implementing a hardware-based security environment and safe use of data, and developing technologies for maintaining privacy, attempts to strengthen the connectivity between devices, optimize the network, promote softwarization of network entities, and increase the openness of wireless communications are continuing.

It is expected that research and development of 6G communication systems in hyper-connectivity, including person to machine (P2M) as well as machine to machine (M2M), will allow the next hyper-connected experience. Particularly, it is expected that services such as truly immersive extended reality (XR), high-fidelity mobile hologram, and digital replica could be provided through 6G communication systems. In addition, services such as remote surgery for security and reliability enhancement, industrial automation, and emergency response will be provided through the 6G communication system such that the technologies could be applied in various fields such as industry, medical care, automobiles, and home appliances.

The above information is presented as background information only to assist with an understanding of the disclosure. No determination has been made, an no assertion is made, as to whether any of the above might be applicable as prior art with regard to the disclosure.

SUMMARY

Aspect of the disclosure are to address at least the above-mentioned problems and/or disadvantages and to provide at least the advantages described below. Accordingly, an aspect of the disclosure is to provide a method and an apparatus for performing a random access procedure.

Additional aspects will be set forth in part in the description which follows and, in part, will be apparent from the description, or may be learned by practice of the presented embodiments.

In accordance with an aspect of the disclosure, a user equipment (UE) is provided. The UE includes a transceiver, and a processor configured to receive, via the transceiver, random access channel (RACH) configuration information from a base station (BS), in case that a type of a random access is identified as 2-step contention free based on the RACH configuration information, select a synchronization signal block (SSB) with synchronization signal-reference signal received power (SS-RSRP) above a configured threshold among SSBs, identify a random access occasion corresponding to the selected SSB, identify a physical uplink shared channel (PUSCH) occasion corresponding to a RACH slot of the selected random access occasion from PUSCH occasions configured based on PUSCH resource configuration information included in the RACH configuration information, and perform msgA transmission based on the identified random access occasion and the identified PUSCH occasion.

Preferably, the PUSCH resource configuration information includes parameters regarding: a modulation coding scheme (MCS) for the msgA transmission on the PUSCH occasion, a number of slots containing one or more PUSCH occasions, a number of time domain PUSCH occasions in each RACH slot, time offset with respect to a start of the each RACH slot, a start symbol and length of the PUSCH occasion, guard period between the PUSCH occasions in the unit of symbols, resource block (RB)-level guard band between the PUSCH occasions in a frequency domain, an offset of lowest PUSCH occasion in frequency domain, a number of RBs per PUSCH occasion, a number of PUSCH occasions in the frequency domain in one time instance and demodulation reference signal (DMRS) configuration for the PUSCH occasion.

Preferably, resource indexes sequentially numbered are mapped to the PUSCH occasions corresponding to the RACH slot.

Preferably, the PUSCH occasions corresponding to the RACH slot are ordered: firstly, in increasing order of frequency resource indexes for frequency multiplexed PUSCH occasions, secondly, in increasing order of DMRS resource indexes within the PUSCH occasion, where a DRMS resource index is determined first in an ascending order of a DMRS port index and then in an ascending order of a DMRS sequence index, thirdly in increasing order of time resource indexes for time multiplexed PUSCH occasions within a PUSCH slot and fourthly, in increasing order of indexes for PUSCH slots.

Preferably, the SSBs are identified based on SSB configuration information included in the RACH configuration information.

In accordance with another aspect of the disclosure, a base station (BS) is provided. The base station includes a transceiver, and a processor configured to transmit, via the transceiver, random access channel (RACH) configuration information to a user equipment (UE) and receive, via the transceiver, msgA based on random access occasion and PUSCH occasion identified based on the RACH configuration information, wherein in case that a type of a random access is identified as 2-step contention free based on the RACH configuration information, a synchronization signal block (SSB) with synchronization signal-reference signal received power (SS-RSRP) above a configured threshold among SSBs is selected at the UE, the random access occasion corresponding to the selected SSB is identified at the UE, the PUSCH occasion corresponding to a RACH slot of the selected random access occasion from PUSCH occasions is identified at the UE, and the PUSCH occasions are configured based on PUSCH resource configuration information included in the RACH configuration information.

Other aspects, advantages, and salient features of the disclosure will become apparent to those skilled in the art from the following detailed description, which, taken in conjunction with the annexed drawings, discloses various embodiments of the disclosure.

BRIEF DESCRIPTION OF THE DRAWINGS

The above and other aspects, features, and advantages of certain embodiments of the disclosure will be more apparent from the following description taken in conjunction with the accompanying drawings, in which.

Throughout the drawings, like reference numerals will be understood to refer to like parts, components, and structures.

DETAILED DESCRIPTION

Figure 1:
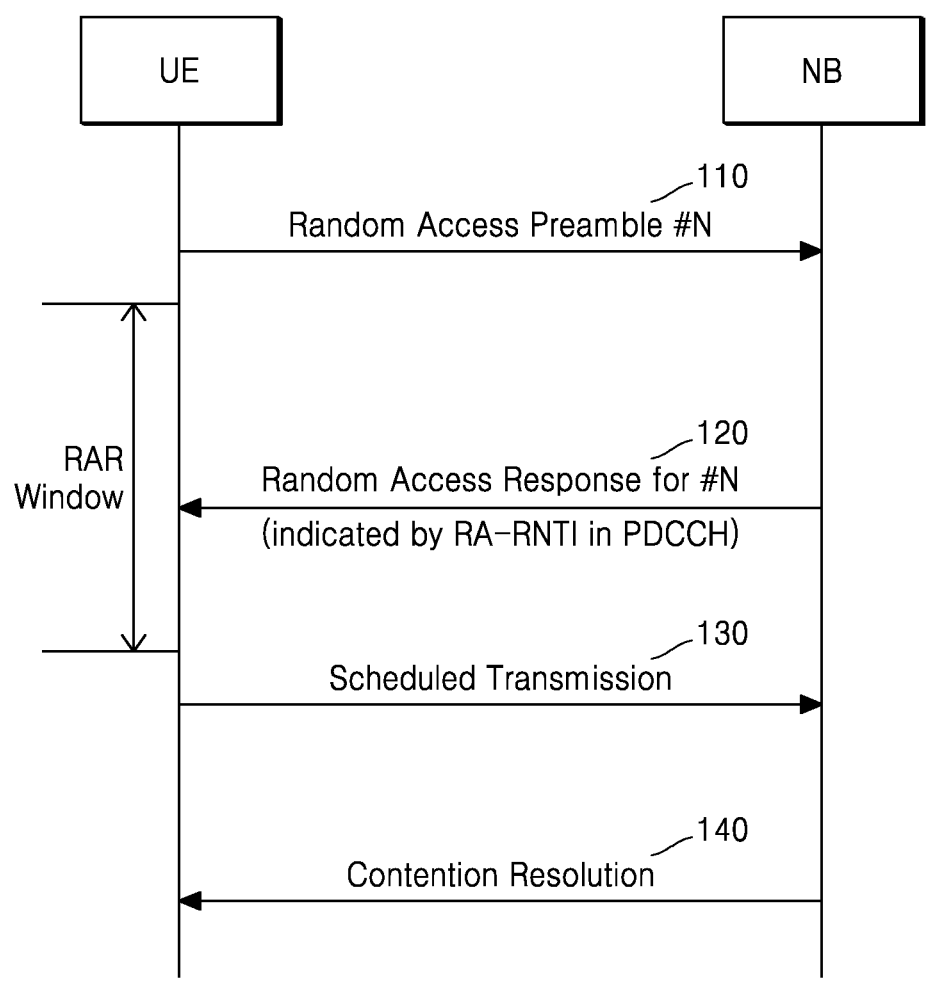
FIG. 1 is a diagram for describing procedures of a user equipment (UE) performing contention-based random access according to an embodiment of the disclosure.

The following description with reference to the accompanying drawings is provided to assist in a comprehensive understanding of various embodiments of the disclosure as defined by the claims and their equivalents. It includes various specific details to assist in that understanding but these are to be regarded as merely exemplary. Accordingly, those of ordinary skill in the art will recognize that various changes and modifications of the various embodiments described herein can be made without departing from the scope and spirit of the disclosure. In addition, descriptions of well-known functions and constructions may be omitted for clarity and conciseness.

The terms and words used in the following description and claims are not limited to the bibliographical meanings, but, are merely used by the inventor to enable a clear and consistent understanding of the disclosure. Accordingly, it should be apparent to those skilled in the art that the following description of various embodiments of the disclosure is provided for illustration purpose only and not for the purpose of limiting the disclosure as defined by the appended claims and their equivalents.

It is to be understood that the singular forms "a," "an," and "the" include plural referents unless the context clearly dictates otherwise. Thus, for example, reference to "a component surface" includes reference to one or more of such surfaces.

Throughout the disclosure, the expression "at least one of a, b or c" indicates only a, only b, only c, both a and b, both a and c, both b and c, all of a, b, and c, or variations thereof.

Examples of a terminal may include a user equipment (UE), a mobile station (MS), a cellular phone, a smartphone, a computer, a multimedia system capable of performing a communication function, or the like.

In the disclosure, a controller may also be referred to as a processor.

Throughout the specification, a layer (or a layer apparatus) may also be referred to as an entity.

Embodiments of the disclosure provide a method and apparatus for supporting various services in a wireless communication system. Specifically, the disclosure provides a technology to manage a random access procedure in a wireless communication system.

In the recent years several broadband wireless technologies have been developed to meet the growing number of broadband subscribers and to provide more and better applications and services. The second generation wireless communication system has been developed to provide voice services while ensuring the mobility of users. Third generation wireless communication system supports not only the voice service but also data service. In recent years, the fourth wireless communication system has been developed to provide high-speed data service. However, currently, the fourth generation wireless communication system suffers from lack of resources to meet the growing demand for high speed data services. So, fifth generation wireless communication system (also referred as next generation radio or NR) is being developed to meet the growing demand for high speed data services, support ultra-reliability and low latency applications.

The fifth generation wireless communication system supports not only lower frequency bands but also in higher frequency (millimeter (mm) Wave) bands, e.g., 10 GHz to 100 GHz bands, so as to accomplish higher data rates. To mitigate propagation loss of the radio waves and increase the transmission distance, the beamforming, massive Multiple-Input Multiple-Output (MIMO), Full Dimensional MIMO (FD-MIMO), array antenna, an analog beam forming, large scale antenna techniques are being considered in the design of fifth generation wireless communication system. In addition, the fifth generation wireless communication system is expected to address different use cases having quite different requirements in terms of data rate, latency, reliability, mobility etc. However, it is expected that the design of the air-interface of the fifth generation wireless communication system would be flexible enough to serve the UEs having quite different capabilities depending on the use case and market segment the UE cater service to the end customer. Few example of use cases the fifth generation wireless communication system wireless system is expected to address is enhanced Mobile Broadband (eMBB), massive Machine Type Communication (m-MTC), ultra-reliable low latency communication (URLLC) etc. The eMBB requirements like tens of Giga bits per second (Gbps) data rate, low latency, high mobility so on and so forth address the market segment representing the wireless broadband of the related art subscribers needing internet connectivity everywhere, all the time and on the go. The m-MTC requirements like very high connection density, infrequent data transmission, very long battery life, low mobility address so on and so forth address the market segment representing the Internet of Things (IoT)/Internet of Everything (IoE) envisioning connectivity of billions of devices. The URLLC requirements like very low latency, very high reliability and variable mobility so on and so forth address the market segment representing the Industrial automation application, vehicle-to-vehicle/vehicle-to-infrastructure communication foreseen as one of the enabler for autonomous cars.

In the fifth generation wireless communication system operating in higher frequency (mmWave) bands, UE and gNB communicates with each other using Beamforming techniques are used to mitigate the propagation path losses and to increase the propagation distance for communication at higher frequency band. Beamforming enhances the transmission and reception performance using a high-gain antenna. Beamforming can be classified into Transmission (TX) beamforming performed in a transmitting end and reception (RX) beamforming performed in a receiving end. In general, the TX beamforming increases directivity by allowing an area in which propagation reaches to be densely located in a specific direction by using a plurality of antennas. In this situation, aggregation of the plurality of antennas can be referred to as an antenna array, and each antenna included in the array can be referred to as an array element. The antenna array can be configured in various forms such as a linear array, a planar array, etc. The use of the TX beamforming results in the increase in the directivity of a signal, thereby increasing a propagation distance. Further, since the signal is almost not transmitted in a direction other than a directivity direction, a signal interference acting on another receiving end is significantly decreased. The receiving end can perform beamforming on a RX signal by using a RX antenna array. The RX beamforming increases the RX signal strength transmitted in a specific direction by allowing propagation to be concentrated in a specific direction, and excludes a signal transmitted in a direction other than the specific direction from the RX signal, thereby providing an effect of blocking an interference signal. By using beamforming technique, a transmitter can make plurality of transmit beam patterns of different directions. Each of these transmit beam patterns can be also referred as transmit (TX) beam. Wireless communication system operating at high frequency uses plurality of narrow TX beams to transmit signals in the cell as each narrow TX beam provides coverage to a part of cell. The narrower the TX beam, higher is the antenna gain and hence the larger the propagation distance of signal transmitted using beamforming A receiver can also make plurality of receive (RX) beam patterns of different directions. Each of these receive patterns can be also referred as receive (RX) beam.

The fifth generation wireless communication system, supports standalone mode of operation as well dual connectivity (DC). In DC a multiple Rx/Tx UE may be configured to utilize resources provided by two different nodes (or NBs) connected via non-ideal backhaul. One node acts as the Master Node (MN) and the other as the Secondary Node (SN). The MN and SN are connected via a network interface and at least the MN is connected to the core network. NR also supports Multi-RAT Dual Connectivity (MR-DC) operation whereby a UE in RRC_CONNECTED is configured to utilize radio resources provided by two distinct schedulers, located in two different nodes connected via a non-ideal backhaul and providing either E-UTRA (i.e. if the node is an ng-eNB) or NR access (i.e. if the node is a gNB). In NR for a UE in RRC_CONNECTED not configured with CA/DC there is only one serving cell comprising of the primary cell. For a UE in RRC_CONNECTED configured with CA/DC the term 'serving cells' is used to denote the set of cells comprising of the Special Cell(s) and all secondary cells. In NR the term Master Cell Group (MCG) refers to a group of serving cells associated with the Master Node, comprising of the PCell and optionally one or more SCells. In NR the term Secondary Cell Group (SCG) refers to a group of serving cells associated with the Secondary Node, comprising of the PSCell and optionally one or more S Cells. In NR PCell (primary cell) refers to a serving cell in MCG, operating on the primary frequency, in which the UE either performs the initial connection establishment procedure or initiates the connection re-establishment procedure. In NR for a UE configured with CA, S cell is a cell providing additional radio resources on top of Special Cell. Primary SCG Cell (PSCell) refers to a serving cell in SCG in which the UE performs random access when performing the Reconfiguration with Sync procedure. For Dual Connectivity operation the term SpCell (i.e. Special Cell) refers to the PCell of the MCG or the PSCell of the SCG, otherwise the term Special Cell refers to the PCell.

In the fifth generation wireless communication system, node B (gNB) or base station in cell broadcast Synchronization Signal and PBCH block (SSB) consists of primary and secondary synchronization signals (PSS, SSS) and system information. System information includes common parameters needed to communicate in cell. In the fifth generation wireless communication system (also referred as next generation radio or NR), System Information (SI) is divided into the MIB and a number of SIBs where:

the MIB is always transmitted on the PBCH with a periodicity of 80 ms and repetitions made within 80 ms and it includes parameters that are needed to acquire SIB1 from the cell.

the SIB1 is transmitted on the DL-SCH with a periodicity of 160 ms and variable transmission repetition. The default transmission repetition periodicity of SIB1 is 20 ms but the actual transmission repetition periodicity is up to network implementation. SIB1 includes information regarding the availability and scheduling (e.g. mapping of SIBs to SI message, periodicity, SI-window size) of other SIBs with an indication whether one or more SIBs are only provided on-demand and, in that case, the configuration needed by the UE to perform the SI request. SIB1 is cell-specific SIB;

SIBs other than SIB1 are carried in SystemInformation (SI) messages, which are transmitted on the DL-SCH. Only SIBs having the same periodicity can be mapped to the same SI message.

In the fifth generation wireless communication system, Physical Downlink Control Channel (PDCCH) is used to schedule DL transmissions on PDSCH and UL transmissions on PUSCH, where the Downlink Control Information (DCI) on PDCCH includes: Downlink assignments containing at least modulation and coding format, resource allocation, and hybrid-ARQ information related to DL-SCH; Uplink scheduling grants containing at least modulation and coding format, resource allocation, and hybrid-ARQ information related to UL-SCH. In addition to scheduling, PDCCH can be used to for: Activation and deactivation of configured PUSCH transmission with configured grant; Activation and deactivation of PDSCH semi-persistent transmission; Notifying one or more UEs of the slot format; Notifying one or more UEs of the PRB(s) and OFDM symbol(s) where the UE may assume no transmission is intended for the UE; Transmission of TPC commands for PUCCH and PUSCH; Transmission of one or more TPC commands for SRS transmissions by one or more UEs; Switching a UE's active bandwidth part; Initiating a random access procedure. A UE monitors a set of PDCCH candidates in the configured monitoring occasions in one or more configured COntrol REsource SETs (CORESETs) according to the corresponding search space configurations. A CORESET consists of a set of PRBs with a time duration of 1 to 3 OFDM symbols. The resource units Resource Element Groups (REGs) and Control Channel Elements (CCEs) are defined within a CORESET with each CCE consisting a set of REGs. Control channels are formed by aggregation of CCE. Different code rates for the control channels are realized by aggregating different number of CCE. Interleaved and non-interleaved CCE-to-REG mapping are supported in a CORESET. Polar coding is used for PDCCH. Each resource element group carrying PDCCH carries its own DMRS. QPSK modulation is used for PDCCH.

In fifth generation wireless communication system, a list of search space configurations are signaled by GNB for each configured BWP wherein each search configuration is uniquely identified by an identifier. Identifier of search space configuration to be used for specific purpose such as paging reception, SI reception, random access response reception is explicitly signaled by gNB. In NR search space configuration comprises of parameters Monitoring-periodicity-PDCCH-slot, Monitoring-offset-PDC CH-slot, Monitoring-symbols-PDCCH-within-slot and duration. A UE determines PDCCH monitoring occasion (s) within a slot using the parameters PDCCH monitoring periodicity (Monitoring-periodicity-PDCCH-slot), the PDCCH monitoring offset (Monitoring-offset-PDCCH-slot), and the PDCCH monitoring pattern (Monitoring-symbols-PDCCH-within-slot). PDCCH monitoring occasions are there in slots 'x' to x+duration where the slot with number 'x' in a radio frame with number 'y' satisfies the equation below:

$$(y*(\text{number of slots in a radio frame})+x-\text{Monitoring-offset-PDCCH-slot}) \bmod (\text{Monitoring-periodicity-PDCCH-slot})=0;$$

The starting symbol of a PDCCH monitoring occasion in each slot having PDCCH monitoring occasion is given by Monitoring-symbols-PDCCH-within-slot. The length (in symbols) of a PDCCH monitoring occasion is given in the corset associated with the search space. search space configuration includes the identifier of coreset configuration associated with it. A list of coreset configurations are signaled by GNB for each configured BWP wherein each coreset configuration is uniquely identified by an identifier. Note that each radio frame is of 10 ms duration. Radio frame is identified by a radio frame number or system frame number. Each radio frame comprises of several slots wherein the number of slots in a radio frame and duration of slots depends on sub carrier spacing. The number of slots in a radio frame and duration of slots depends radio frame for each supported SCS is pre-defined in NR. Each coreset configuration is associated with a list of TCI (Transmission configuration indicator) states. One DL RS ID (SSB or CSI RS) is configured per TCI state. The list of TCI states corresponding to a coreset configuration is signaled by gNB via RRC signaling. One of the TCI state in TCI state list is activated and indicated to UE by gNB. TCI state indicates the DL TX beam (DL TX beam is QCLed with SSB/CSI RS of TCI state) used by gNB for transmission of PDCCH in the PDCCH monitoring occasions of a search space.

In fifth generation wireless communication system bandwidth adaptation (BA) is supported. With BA, the receive and transmit bandwidth of a UE need not be as large as the bandwidth of the cell and can be adjusted: the width can be ordered to change (e.g. to shrink during period of low activity to save power); the location can move in the frequency domain (e.g. to increase scheduling flexibility); and the subcarrier spacing can be ordered to change (e.g. to allow different services). A subset of the total cell bandwidth of a cell is referred to as a Bandwidth Part (BWP). BA is achieved by configuring RRC connected UE with BWP(s) and telling the UE which of the configured BWPs is currently the active one. When BA is configured, the UE only has to monitor PDCCH on the one active BWP i.e. it does not have to monitor PDCCH on the entire DL frequency of the serving cell. In RRC connected state, UE is configured with one or more DL and UL BWPs, for each configured Serving Cell (i.e. PCell or SCell). For an activated Serving Cell, there is always one active UL and DL BWP at any point in time. The BWP switching for a Serving Cell is used to activate an inactive BWP and deactivate an active BWP at a time. The BWP switching is controlled by the PDCCH indicating a downlink assignment or an uplink grant, by the bwp-InactivityTimer, by RRC signaling, or by the MAC entity itself upon initiation of Random Access procedure. Upon addition of SpCell or activation of an SCell, the DL BWP and UL BWP indicated by firstActiveDownlinkBWP-Id and firstActiveUplinkBWP-Id respectively is active without receiving PDCCH indicating a downlink assignment or an uplink grant. The active BWP for a Serving Cell is indicated by either RRC or PDCCH. For unpaired spectrum, a DL BWP is paired with a UL BWP, and BWP switching is common for both UL and DL. Upon expiry of BWP inactivity timer UE switch to the active DL BWP to the default DL BWP or initial DL BWP (if default DL BWP is not configured).

In the 5th generation (5G) wireless communication system, random access (RA) is supported. Random access (RA) is used to achieve uplink (UL) time synchronization. RA is used during initial access, handover, radio resource control (RRC) connection re-establishment procedure, scheduling request transmission, secondary cell group (SCG) addition/modification, beam failure recovery and data or control information transmission in UL by non-synchronized UE in RRC CONNECTED state. Several types of random access procedures are supported.

Hereinafter, embodiments of the disclosure will be described in detail with reference to accompanying drawings.

FIG. 1 is a diagram for describing procedures of a UE performing contention-based random access according to an embodiment of the disclosure.

Referring to FIG. 1, contention based random access (CBRA) is also, referred as 4 step CBRA. In this type of random access, UE first transmits Random Access preamble (also referred as Msg1) at operation 110 and then waits for Random access response (RAR) in the RAR window. RAR is also referred as Msg2. Next generation node B (gNB) transmits the RAR on physical downlink shared channel (PDSCH) at operation 120. PDCCH scheduling the PDSCH carrying RAR is addressed to RA-radio network temporary identifier (RA-RNTI). RA-RNTI identifies the time-frequency resource (also referred as physical RA channel (PRACH) occasion or PRACH transmission (TX) occasion or RA channel (RACH) occasion) in which RA preamble was detected by gNB. The RA-RNTI is calculated as follows: RA-RNTI=$1+s\_id+14*t\_id+14*80*f\_id+14*80*8*ul\_carrier\_id$, where $s\_id$ is the index of the first orthogonal frequency division multiplexing (OFDM) symbol of the PRACH occasion where UE has transmitted Msg1, i.e. RA preamble; $0 \leq s\_id < 14$; $t\_id$ is the index of the first slot of the PRACH occasion ($0 \leq t\_id < 80$); $f\_id$ is the index of the PRACH occasion within the slot in the frequency domain ($0 \leq f\_id < 8$), and $ul\_carrier\_id$ is the UL carrier used for Msg1 transmission (0 for normal UL (NUL) carrier and 1 for supplementary UL (SUL) carrier. Several RARs for various Random access preambles detected by gNB can be multiplexed in the same RAR media access control (MAC) protocol data unit (PDU) by gNB. An RAR in MAC PDU corresponds to UE's RA preamble transmission if the RAR includes an RA preamble identifier (RAPID) of RA preamble transmitted by the UE. If the RAR corresponding to its RA preamble transmission is not received during the RAR window and UE has not yet transmitted the RA preamble for a configurable (configured by gNB in RACH configuration) number of times, the UE goes back to first step i.e. select random access resource (preamble/RACH occasion) and transmits the RA preamble. A backoff may be applied before going back to first step.

If the RAR corresponding to its RA preamble transmission is received the UE transmits message 3 (Msg3) according to UL grant received in RAR, at operation 130. Msg3 includes message such as RRC connection request, RRC connection re-establishment request, RRC handover confirm, scheduling request, SI request etc. It may include the UE identity (i.e. cell-radio network temporary identifier (C-RNTI) or system architecture evolution (SAE)-temporary mobile subscriber identity (S-TMSI) or a random number). After transmitting the Msg3, UE starts a contention resolution timer. While the contention resolution timer is running, if UE receives a physical downlink control channel (PDCCH) addressed to C-RNTI included in Msg3, at operation 140, contention resolution is considered successful, contention resolution timer is stopped and RA procedure is completed. While the contention resolution timer is running, if UE receives contention resolution MAC control element (CE) including the UE's contention resolution identity (first X bits of common control channel (CCCH) service data unit (SDU) transmitted in Msg3), at operation 140, contention resolution is considered successful, contention resolution timer is stopped and RA procedure is completed. If the contention resolution timer expires and UE has not yet transmitted the RA preamble for a configurable number of times, UE goes back to first step i.e. select random access resource (preamble/RACH occasion) and transmits the RA preamble. A backoff may be applied before going back to first step.

Figure 2:
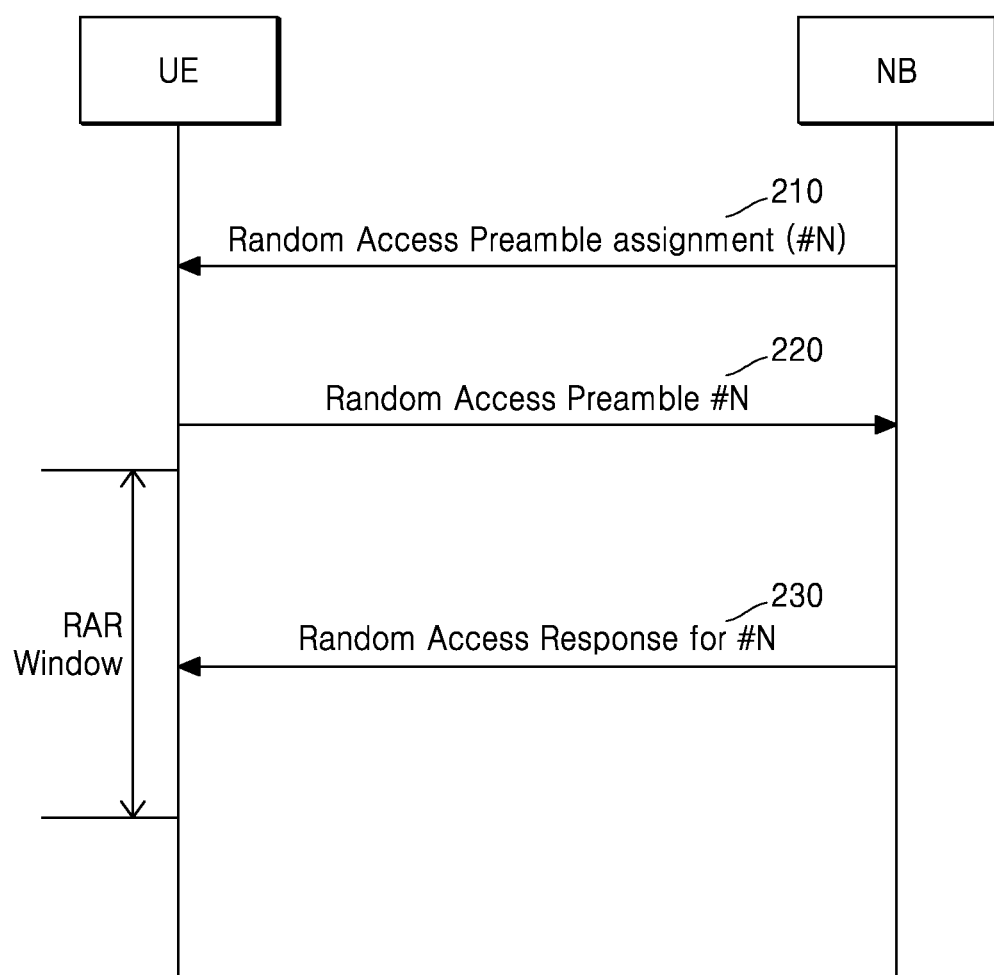
FIG. 2 is a diagram for describing procedures of a UE performing contention free random access according to an embodiment of the disclosure.

FIG. 2 is a diagram for describing procedures of a UE performing contention free random access according to an embodiment of the disclosure.

Referring to FIG. 2, contention free random access (CFRA) is also referred as legacy CFRA or 4 step CFRA. CFRA procedure is used for scenarios such as handover where low latency is required, timing advance establishment for secondary cell (Scell), etc. Evolved node B (eNB) assigns to UE dedicated Random access preamble at operation 210. UE transmits the dedicated RA preamble at operation 220. ENB transmits the RAR on PDSCH addressed to RA-RNTI at operation 230. RAR conveys RA preamble identifier and timing alignment information. RAR may also include UL grant. RAR is transmitted in RAR window similar to contention based RA (CBRA) procedure. CFRA is considered successfully completed after receiving the RAR including RA preamble identifier (RAPID) of RA preamble transmitted by the UE. In case RA is initiated for beam failure recovery, CFRA is considered successfully completed if PDCCH addressed to C-RNTI is received in search space for beam failure recovery. If the RAR window expires and RA is not successfully completed and UE has not yet transmitted the RA preamble for a configurable (configured by gNB in RACH configuration) number of times, the UE retransmits the RA preamble.

For certain events such has handover and beam failure recovery if dedicated preamble(s) are assigned to UE, during first step of random access i.e. during random access resource selection for Msg1 transmission UE determines whether to transmit dedicated preamble or non dedicated preamble. Dedicated preambles is typically provided for a subset of SSBs/CSI RSs. If there is no SSB/CSI RS having DL RSRP above a threshold amongst the SSBs/CSI RSs for which contention free random access resources (i.e. dedicated preambles/ROs) are provided by gNB, UE select non dedicated preamble. Otherwise UE select dedicated preamble. So, during the RA procedure, one random access attempt can be CFRA while other random access attempt can be CBRA.

2 step contention based random access (2 step CBRA): In the first step, UE transmits random access preamble on PRACH and a payload (i.e. MAC PDU) on PUSCH. The random access preamble and payload transmission is also referred as MsgA. In the second step, after MsgA transmission, the UE monitors for a response from the network (i.e. gNB) within a configured window. The response is also referred as MsgB. If CCCH SDU was transmitted in MsgA payload, UE performs contention resolution using the contention resolution information in MsgB. The contention resolution is successful if the contention resolution identity received in MsgB matches first 48 bits of CCCH SDU transmitted in MsgA. If C-RNTI was transmitted in MsgA payload, the contention resolution is successful if UE receives PDCCH addressed to C-RNTI. If contention resolution is successful, random access procedure is considered successfully completed. Instead of contention resolution information corresponding to the transmitted MsgA, MsgB may include a fallback information corresponding to the random access preamble transmitted in MsgA. If the fallback information is received, UE transmits Msg3 and performs contention resolution using Msg4 as in CBRA procedure. If contention resolution is successful, random access procedure is considered successfully completed. If contention resolution fails upon fallback (i.e. upon transmitting Msg3), UE retransmits MsgA. If configured window in which UE monitor network response after transmitting MsgA expires and UE has not received MsgB including contention resolution information or fallback information as explained above, UE retransmits MsgA. If the random access procedure is not successfully completed even after transmitting the msgA configurable number of times, UE fallbacks to 4 step RACH procedure i.e. UE only transmits the PRACH preamble.

MsgA payload may include one or more of common control channel (CCCH) service data unit (SDU), dedicated control channel (DCCH) SDU, dedicated traffic channel (DTCH) SDU, buffer status report (BSR) MAC control element (CE), power headroom report (PHR) MAC CE, SSB information, C-RNTI MAC CE, or padding. MsgA may include UE ID (e.g. random ID, S-TMSI, C-RNTI, resume ID, etc.) along with preamble in first step. The UE ID may be included in the MAC PDU of the MsgA. UE ID such as C-RNTI may be carried in MAC CE wherein MAC CE is included i n MAC PDU. Other UE IDs (such random ID, S-TMSI, C-RNTI, resume ID, etc.) may be carried in CCCH SDU. The UE ID can be one of random ID, S-TMSI, C-RNTI, resume ID, IMSI, idle mode ID, inactive mode ID, etc. The UE ID can be different in different scenarios in which UE performs the RA procedure. When UE performs RA after power on (before it is attached to the network), then UE ID is the random ID. When UE perform RA in IDLE state after it is attached to network, the UE ID is S-TMSI. If UE has an assigned C-RNTI (e.g. in connected state), the UE ID is C-RNTI. In case UE is in INACTIVE state, UE ID is resume ID. In addition to UE ID, some addition ctrl information can be sent in MsgA. The control information may be included in the MAC PDU of the MsgA. The control information may include one or more of connection request indication, connection resume request indication, SI request indication, buffer stat us indication, beam information (e.g. one or more DL TX beam ID(s) or SSB ID(s)), beam failure recovery indication/information, data indicator, cell/BS/TRP switching indication, connection re-establishment indication, reconfiguration complete or handover complete message, etc.

UE determines the preambles/PRACH Occasions and their association with SS/PBCH blocks as follows:

For 2 step CBRA with common PRACH occasions with 4 step CBRA, a UE is provided a number N of SS/PBCH blocks associated with one PRACH occasion by ssb-per-RACH-OccasionAndCB-PreamblesPerSSB and a number R of contention based preambles per SS/PBCH block per valid PRACH occasion by msgA-CB-PreamblesPerSSB. The R contention based preambles per SS/PBCH block per valid PRACH occasion for 2 step CBRA start after the ones for 4 step CBRA.

For 2 step CBRA, with separate PRACH occasions with 4 step CBRA, UE is provided a number N of SS/PBCH blocks associated with one PRACH occasion and a number R of contention based preambles per SS/PBCH block per valid PRACH occasion by ssb-perRACH-OccasionAndCB-PreamblesPerSSB-msgA when provided; otherwise, by ssb-perRACH-OccasionAndCB-PreamblesPerSSB.

For 2 step CBRA, with separate PRACH occasions with 4 step CBRA, if N<1, one SS/PBCH block is mapped to i/Iv consecutive valid PRACH occasions and R contention based preambles with consecutive indexes associated with the SS/PBCH block per valid PRACH occasion start from zero. If N≥1, R contention based preambles with consecutive indexes associated with SS/PBCH block n, 0≤n≤N−1, per valid PRACH occasion start from preamble index $n \cdot N_{preamble}^{total}/N$ where $N_{preamble}^{total}$ preamble is provided by msgA-totalNumberOfRA-Preambles, and is an integer multiple of N.

For 2 step CBRA, with common PRACH occasions with 4 step CBRA, if N<1, one SS/PBCH block is mapped to i/N consecutive valid PRACH occasions and R contention based preambles with consecutive indexes associated with the SS/PBCH block per valid PRACH occasion start from 'last preamble index for 4 step CBRA+1'. If N≥1, R contention based preambles with consecutive indexes associated with SS/PBCH block n, 0≤n≤N−1, per valid PRACH occasion start from preamble index 'last preamble index for 4 step CBRA+1'+$n \cdot N_{preamble}^{total}/N$ where $N_{preamble}^{total}$ is provided by msgA-totalNumberOfRA-Preambles, and is an integer multiple of N.

PRACH occasions are indicated by parameter prach-ConfigIndex. SS/PBCH block indexes provided by ssb-PositionsInBurst in SIB1 or in ServingCellConfigCommon are mapped to valid PRACH occasions in the following order:

First, in increasing order of preamble indexes within a single PRACH occasion

Second, in increasing order of frequency resource indexes for frequency multiplexed PRACH occasions Third, in increasing order of time resource indexes for time multiplexed PRACH occasions within a PRACH slot Fourth, in increasing order of indexes for PRACH slots An association period, starting from frame 0, for mapping SS/PBCH blocks to PRACH occasions is the period such that $n_{Tx}^{SSB}$ SS/PBCH blocks are mapped at least once to the PRACH occasions within the association period, where a UE obtains $n_{Tx}^{SSB}$ from the value of ssb-PositionsInBurst in SIB1 or in ServingCellConfigCommon. An association pattern period includes one or more association periods and is determined so that a pattern between PRACH occasions and SS/PBCH blocks repeats at most every 160 msec.

2 step contention free random access (2 step CFRA): In this case gNB assigns to UE dedicated Random access preamble (s) and PUSCH resource(s) for MsgA transmission. RO(s) to be used for preamble transmission may also be indicated. In the first step, UE transmits random access preamble on PRACH and a payload on PUSCH using the contention free random access resources (i.e. dedicated preamble/PUSCH resource/RO). In the second step, after MsgA transmission, the UE monitors for a response from the network (i.e. gNB) within a configured window. If UE receives PDCCH addressed to C-RNTI, random access procedure is considered successfully completed. If UE receives fallback information corresponding to its transmitted preamble, random access procedure is considered successfully completed.

For certain events such has handover and beam failure recovery if dedicated preamble(s) and PUSCH resource(s) are assigned to UE, during first step of random access i.e. during random access resource selection for MsgA transmission UE determines whether to transmit dedicated preamble or non dedicated preamble. Dedicated preambles are typically provided for a subset of SSBs/CSI RSs. If there is no SSB/CSI RS having DL RSRP above a threshold amongst the SSBs/CSI RSs for which contention free random access resources (i.e. dedicated preambles/ROs/PUSCH resources) are provided by gNB, UE select non dedicated preamble. Otherwise UE select dedicated preamble. So, during the RA procedure, one random access attempt can be 2 step CFRA while other random access attempt can be 2 step CBRA.

Upon initiation of random access procedure, UE first selects the carrier (SUL or NUL). If the carrier to use for the Random Access procedure is explicitly signaled by gNB, UE select the signaled carrier for performing Random Access procedure. If the carrier to use for the Random Access procedure is not explicitly signaled by gNB; and if the Serving Cell for the Random Access procedure is configured with supplementary uplink and if the RSRP of the downlink pathloss reference is less than rsrp-Threshold-SSB-SUL: UE select the SUL carrier for performing Random Access procedure. Otherwise, UE select the NUL carrier for performing Random Access procedure. Upon selecting the UL carrier, UE determines the UL and DL BWP for random access procedure as specified in section 5.15 of TS 38.321. UE then determines whether to perform 2 step or 4 step RACH for this random access procedure.

If this random access procedure is initiated by PDCCH order and if the ra-PreambleIndex explicitly provided by PDCCH is not 0b000000, UE selects 4 step RACH.

else if 2 step contention free random access resources are signaled by gNB for this random access procedure, UE selects 2 step RACH.

else if 4 step contention free random access resources are signaled by gNB for this random access procedure, UE selects 4 step RACH.

else if the UL BWP selected for this random access procedure is configured with only 2 step RACH resources, UE selects 2 step RACH.

else if the UL BWP selected for this random access procedure is configured with only 4 step RACH resources, UE selects 4 step RACH.

else if the UL BWP selected for this random access procedure is configured with both 2 step and 4 step RACH resources, if RSRP of the downlink pathloss reference is below a configured threshold, UE selects 4 step RACH. Otherwise UE selects 2 step RACH.

For 2 step CBRA, UE determines time resources and frequency resources for PUSCH occasions in an active UL BWP from msgA-PUSCH-config for the active UL BWP. If the active UL BWP is not the initial UL BWP and msgA-PUSCH-config is not provided for the active UL BWP, the UE uses the msgA-PUSCH-config provided for the initial active UL BWP. The PRACH occasions/preambles are mapped to PUSCH occasions (configured by msgA-PUSCH-config) as follows:

A consecutive number of $N_{preamble}$ preamble indexes from valid PRACH occasions in a PRACH slot first, in increasing order of preamble indexes within a single PRACH occasion second, in increasing order of frequency resource indexes for frequency multiplexed PRACH occasions third, in increasing order of time resource indexes for time multiplexed PRACH occasions within a PRACH slot are mapped to a valid PUSCH occasion first, in increasing order of frequency resource indexes $f_{id}$ for frequency multiplexed PUSCH occasions second, in increasing order of DMRS indexes within a PUSCH occasion, where a DMRS index $DMRS_{id}$ is determined first in an ascending order of a DMRS port index and second in an ascending order of a DMRS sequence index third, in increasing order of time resource indexes $t_{id}$ for time multiplexed PUSCH occasions within a PUSCH slot fourth, in increasing order of indexes for PUSCH slots corresponding to this PRACH slot where $N_{preamble}=\text{ceil}(T_{preamble}/T_{PUSCH})T_{preamble}$ is a total number of preambles in valid PRACH occasions per association pattern period, and $T_{PUSCH}$ is a total number of valid sets of PUSCH occasions per association pattern period multiplied by the number of DMRS indexes per valid PUSCH occasion. A PUSCH occasion is valid if it does not overlap in time and frequency with any PRACH occasion associated with either a 4 step RA or a 2 step RA. Additionally, if a UE is provided tdd-UL-DL-ConfigurationCommon, a PUSCH occasion is valid if it is within UL symbols, or it does not precede a SS/PBCH block in the PUSCH slot and starts at least $N_{gap}$ symbols after a last downlink symbol and at least $N_{gap}$ symbols after a last SS/PBCH block symbol, where $N_{gap}$ is zero for preamble SCS of 1.25 kilohertz (KHz)/5 KHz, is 2 for preamble SCS of 15/30/60/120 KHz.

The above mechanism requires UE to be aware of all the preambles available in each of the valid PRACH occasions in association pattern period. In case of 2 step CBRA, UE is aware of all the preambles available in each of the valid PRACH occasions in association pattern period. However, in case of 2 step CFRA, UE does not know all the contention free random access preambles used by gNB. UE is only aware of contention free preambles assigned to it for one or more SSBs. So, a mechanism to signal dedicated PUSCH resources for 2 step CFRA is needed.

First Embodiment

In an embodiment it is proposed that PUSCH Resource configuration for 2 step CFRA is separately configured from PUSCH Resource configuration for 2 step CBRA.

For the PUSCH resource configuration for 2 step CBRA, msgA-PUSCH-ResourceList is included in common configuration of BWP. It is a list of MsgA-PUSCH-Resource. MsgA-PUSCH-Resource IE includes PUSCH parameters to determine PUSCH occasions. If 2 step RA is supported in a BWP and msgA-PUSCH-ResourceList is not included in common configuration of that BWP, msgA-PUSCH-ResourceList from initial BWP is used.

For the 2 step CFRA configuration, msgA-PUSCH-Resource-CFRA is included in RACH-ConfigDedicated IE of RRC Reconfiguration message. RRC Reconfiguration message is sent by gNB to UE. msgA-PUSCH-Resource-CFRA applies to BWP indicated by parameter first active uplink BWP. msgA-PUSCH-Resource-CFRA includes PUSCH parameters to determine PUSCH occasions. MCS/number of PRBs for each PUSCH occasion is part of msgA-PUSCH-Resource-CFRA MsgA-PUSCH-Resource/msgA-PUSCH-Resource-CFRA parameters:

frequencyStartMsgAPUSCH: UE determines first RB for a first PUSCH occasion in an UL BWP from frequencyStartMsgAPUSCH that provides an offset, in number of RBs in the UL BWP, from a first RB of the UL BWP.

nrofPRBsperMsgAPO: A PUSCH occasion includes a number of RBs provided by nrofPRBsperMsgAPO.

guardBandMsgAPUSCH: Consecutive PUSCH occasions in the frequency domain of an UL BWP are separated by a number of RBs provided by guardBandMsgAPUSCH.

nrMsgAPO-FDM: A number of PUSCH occasions in the frequency domain of an UL BWP is provided by nrMsgAPO-FDM.

msgAPUSCH-timeDomainOffset: UE determines a first slot for a first PUSCH occasion in an UL BWP from msgAPUSCH-timeDomainOffset that provides an offset, in number of slots in the UL BWP, relative to the start of each PRACH slot.

guardPeriodMsgAPUSCH: Consecutive PUSCH occasions within each slot are separated by guardPeriodMsgAPUSCH symbols and have same duration.

nrofMsgAPOperSlot: A number $N_t$ of time domain PUSCH occasions in each slot is provided by nrofMsgAPOperSlot, nrofSlotsMsgAPUSCH: A number of consecutive slots that include PUSCH occasions is provided by nrofSlotsMsgAPUSCH.

startSymbolAndLengthMsgAPO: Starting symbol and length of PUSCH occasion in a PUSCH slot is given by startSymbolAndLengthMsgAPO msgA-DMRS-Configuration: A UE is provided a DMRS configuration for a PUSCH transmission in a PUSCH occasion in an active UL BWP by msgA-DMRS-Configuration.

msgA-MCS: A UE is provided an MCS for data information in a PUSCH transmission for a PUSCH occasion by msgA-MCS.

Figure 3:
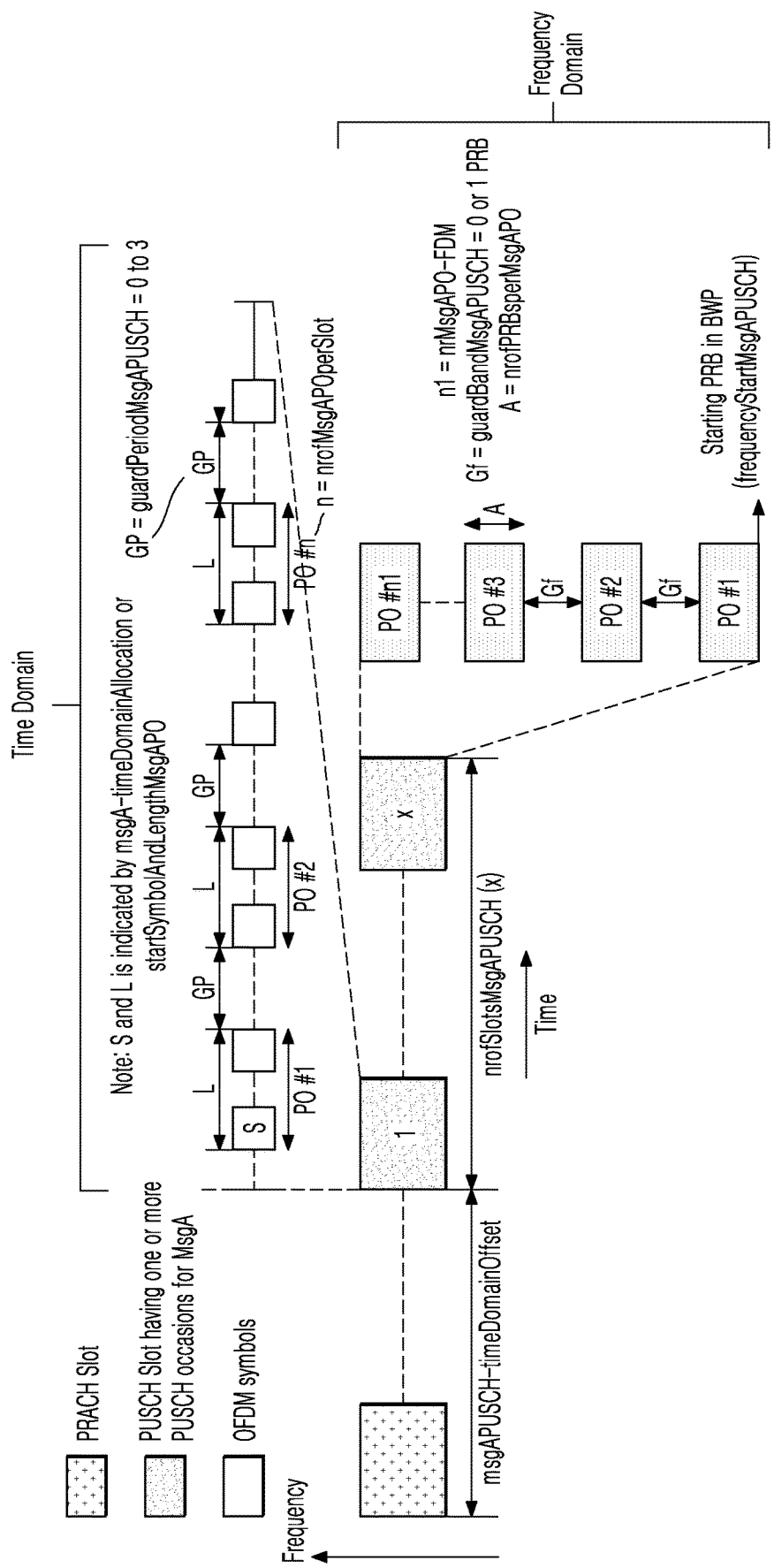
FIG. 3 is an example illustration of these parameters for indicating physical uplink shared channel (PUSCH) resources with respect to physical RA channel (PRACH) slot according to an embodiment of the disclosure.

FIG. 3 is an example illustration of these parameters for indicating PUSCH resources (or PUSCH occasions) with respect to PRACH slot according to an embodiment of the disclosure.

Referring to FIG. 3, in an embodiment, if msgA-PUSCH-Resource-CFRA is not signaled by GNB for 2 step CFRA:

UE uses MsgA-PUSCH-Resource from msgA-PUSCH-ResourceList configured for 2 step CBRA. In case msgA-PUSCH-ResourceList includes both group A and group PUSCH resources:

UE can use PUSCH Resource configuration corresponding to group A from configuration for 2 step CBRA; or UE can use PUSCH Resource configuration corresponding to group B from configuration for 2 step CBRA; or The PUSCH Resource configuration (group A or group B) to be used from configuration for 2 step CBRA is indicated in 2 step CFRA configuration or UE can select PUSCH Resource configuration corresponding to group A or group B based on MsgA MAC PDU size For example, if the potential MSGA payload size (UL data available for transmission plus MAC header and, where required, MAC CEs) is greater than group A MsgA size and the pathloss is less than PCMAX (of the Serving Cell performing the Random Access Procedure)−preambleReceivedTargetPower−msgA-DeltaPreamble−messagePowerOffsetGroupB: select group B. Otherwise, select the group A.

In an embodiment, it is proposed that for 2 step CFRA, in RACH-ConfigDedicated, RA preamble index, and PUSCH occasion index (is also referred as PUSCH resource index) is signaled for one or more SSBs/CSI RSs. In an embodiment rach-ConfigGeneric2step (to provide ROs for 2 step CFRA, which are different from 2 step CBRA) can also be signaled in RACH-ConfigDedicated. In an embodiment msgA-SSB-sharedRO-MaskIndex can also be signaled (in RACH-ConfigDedicated, note that msgA-SSB-sharedRO-MaskIndex is configured separately for 2 step CBRA and 2 step CFRA) in case ROs for 2 step CFRA are shared with 4 step and indicated which of the 4 step ROs are shared with 2 step CFRA. For an SSB, there can be several ROs and msgA-SSB-sharedRO-MaskIndex is used to indicated a subset of these ROs. Table 1 is an example illustration where a pusch-OccasionIndexList indicates PUSCH occasion index for each RO in ra-OccasionList. The ith entry in pusch-OccasionIndexList corresponds to ith entry in ra-OccasionList. In an embodiment, instead of pusch-OccasionIndexList for CSI-RS, one PUSCH occasion index can be there.

TABLE 1

RACH-ConfigDedicated ::=    SEQUENCE {
  cfra-TwoStep-r16            CFRA-2STEP
}
CFRA-2STEP ::=               SEQUENCE {
occasions                    SEQUENCE {
  rach-ConfigGeneric2step    RACH-ConfigGeneric, TABLE 1-continued

```
    ssb-perRACH-Occasion      ENUMERATED {oneEighth, oneFourth, oneHalf,
one, two, four, eight, sixteen}
                    OPTIONAL -- Cond SSB-CFRA
  }
msgA-PUSCH-Resource-CFRA          Msg A-PUSCH-Resource-r16
msgA-SSB-sharedRO-MaskIndex-r16                INTEGER (1..15)
resources            CHOICE {
    ssb            SEQUENCE {
      ssb-ResourceList       SEQUENCE (SIZE(1..maxRA-SSB-Resources))
OF CFRA-SSB-Resource,
      ra-ssb-OccasionMaskIndex    INTEGER (0.. 15)
    },
    csirs          SEQUENCE {
      csirs-ResourceList      SEQUENCE (SIZE(1..maxRA-CSIRS-
Resources)) OF CFRA-CSIRS-Resource,
      rsrp-ThresholdCSI-RS    RSRP-Range
    }
  },
}
CFRA-SSB-Resource ::=    SEQUENCE {
  ssb          SSB-Index,
  ra-PreambleIndex      INTEGER (0.. 63),
  pusch-OccasionIndex       PUSCH-Occasion-Index
  . . .
}
CFRA-CSIRS-Resource ::=     SEQUENCE {
  csi-RS        CSI-RS-Index,
  ra-OccasionList     SEQUENCE (SIZE(1..maxRA-OccasionsPerCSIRS))
OF INTEGER (0..maxRA-Occasions-1),
  ra-PreambleIndex      INTEGER (0.. 63),
    pusch-OccasionIndexList    SEQUENCE (SIZE(1..maxRA-
OccasionsPerCSIRS)) OF PUSCH-Occasion-Index
  . . .
}
PUSCH-Occasion-Index ::=        INTEGER (0..X),
-- TAG-RACH-CONFIGDEDICATED-STOP
-- ASN1STOP
```

Figure 4:
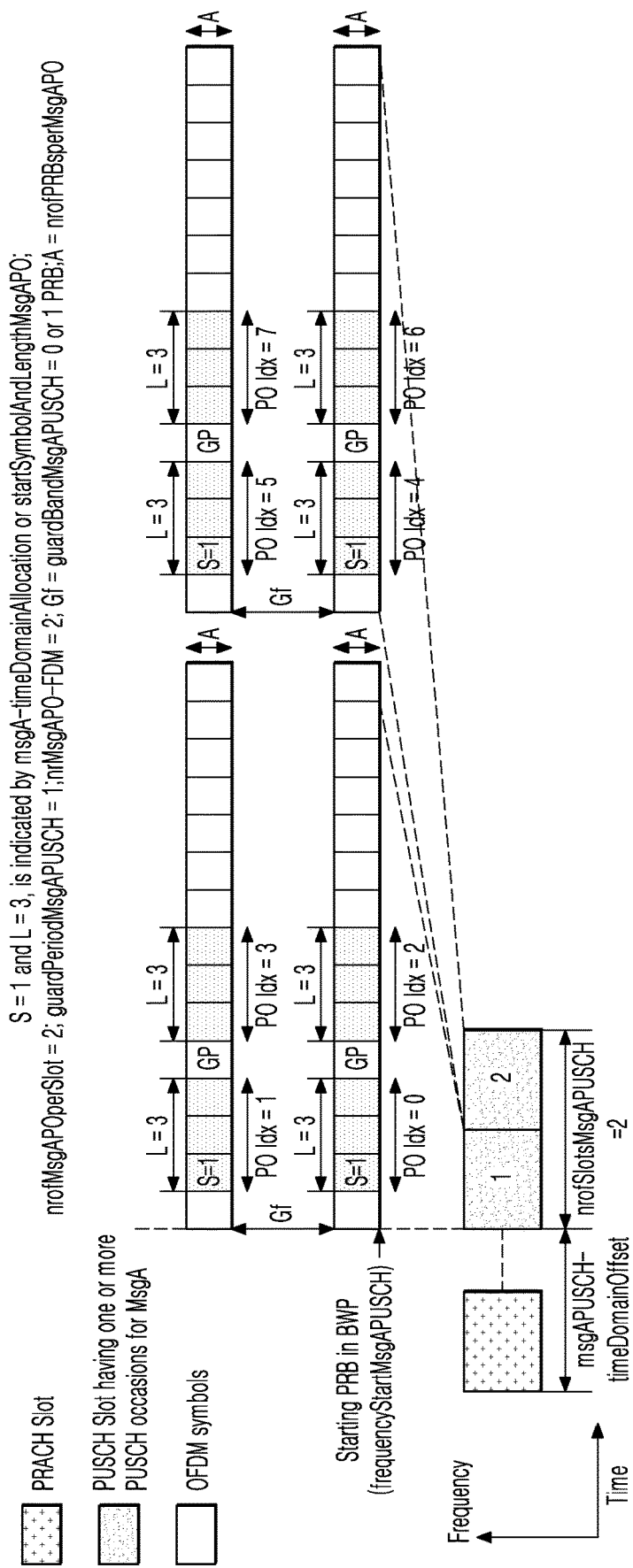
FIG. 4 is an illustration for describing the PUSCH occasion indexing according to an embodiment of the disclosure.

In an embodiment PUSCH occasion indexing is performed as follows:

FIG. 4 is an illustration for describing the PUSCH occasion indexing according to an embodiment of the disclosure.

Referring to FIG. 4, in an embodiment, each valid PUSCH occasion corresponding to a PRACH slot is sequentially numbered (e.g. from zero), first, in increasing order of frequency resource indexes for frequency multiplexed PUSCH occasions; second, in increasing order of time resource indexes for time multiplexed PUSCH occasions within a PUSCH slot and Third, in increasing order of indexes for PUSCH slots corresponding to a PRACH slot.

For example, let's say that for a PRACH slot, there are two PUSCH slot, each PUSCH slot has three PUSCH occasions in time domain and two PUSCH occasions in frequency domain. PUSCH occasion indexing according to this embodiment is illustrated in FIG. 5.

Figure 5:
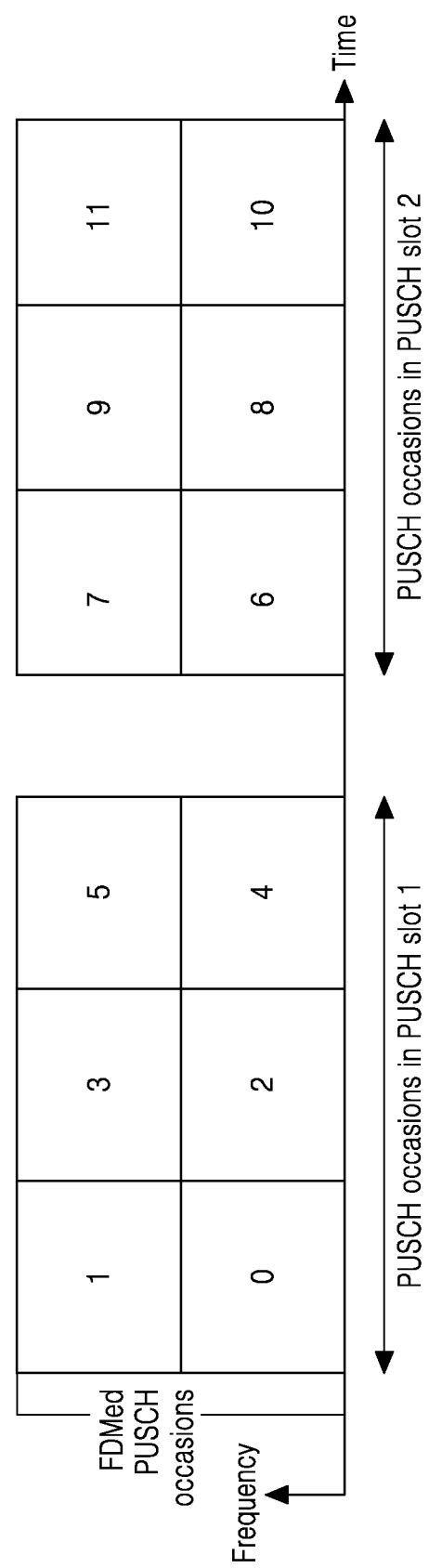
FIG. 5 is an illustration for describing the PUSCH occasion indexing according to an embodiment of the disclosure.

FIG. 5 is an illustration for describing the PUSCH occasion indexing according to an embodiment of the disclosure.

Referring to FIG. 5, in an alternate embodiment, each valid PUSCH occasion corresponding to a PRACH slot is sequentially numbered (e.g. from zero), first in increasing order of DMRS indexes within a PUSCH occasion, where a DMRS index is determined first in an ascending order of a DMRS port index and second in an ascending order of a DMRS sequence index, second, in increasing order of frequency resource indexes for frequency multiplexed PUSCH occasions; third, in increasing order of time resource indexes for time multiplexed PUSCH occasions within a PUSCH slot and fourth, in increasing order of indexes for PUSCH slots corresponding to a PRACH slot.

Figure 6:
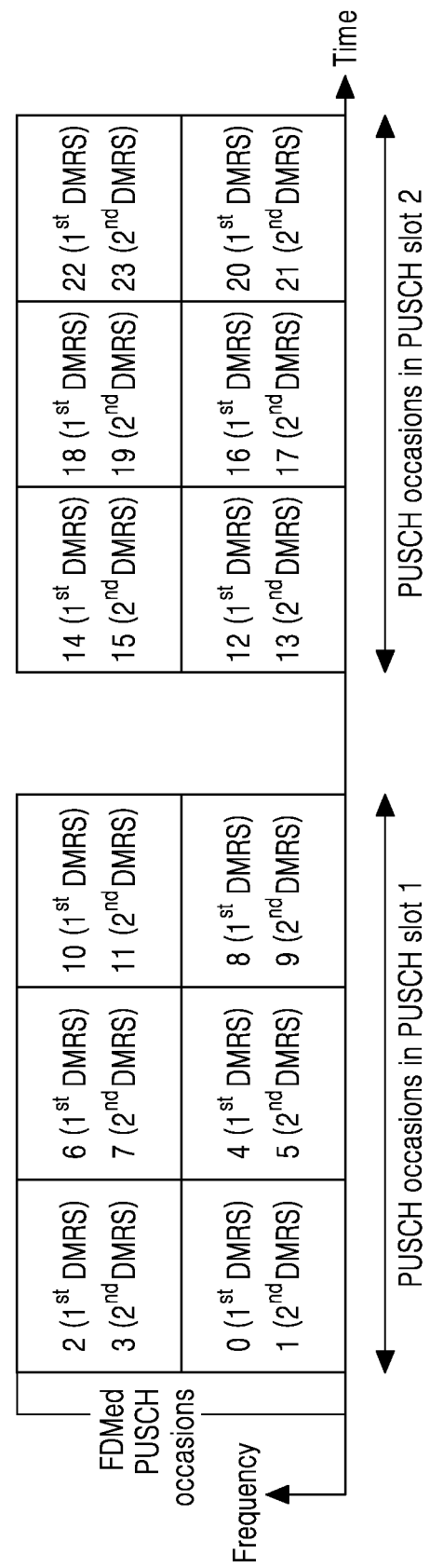
FIG. 6 is an illustration for describing the PUSCH occasion indexing according to an embodiment of the disclosure.

FIG. 6 is an illustration for describing the PUSCH occasion indexing according to an embodiment of the disclosure.

For example, let's say that for a PRACH slot, there are two PUSCH slot, each PUSCH slot has three PUSCH occasions in time domain and two PUSCH occasions in frequency domain. Each PUSCH occasion has two DMRS resource with index 0 and 1. PUSCH occasion indexing corresponding to this embodiment is illustrated in FIG. 6. Since there are two DMRS resources for each PUSCH occasion, there are two PUSCH occasion index assigned to a PUSCH occasion, each corresponding to different DMRS resource in that PUSCH occasion.

Referring to FIG. 6, in an alternate embodiment, each valid PUSCH occasion corresponding to a PRACH slot is sequentially numbered (e.g. from zero), first, in increasing order of frequency resource indexes for frequency multiplexed PUSCH occasions; second in increasing order of DMRS indexes within a PUSCH occasion, where a DMRS index is determined first in an ascending order of a DMRS port index and second in an ascending order of a DMRS sequence index, third, in increasing order of frequency resource indexes for frequency multiplexed PUSCH occasions; third, in increasing order of time resource indexes for time multiplexed PUSCH occasions within a PUSCH slot and fourth, in increasing order of indexes for PUSCH slots corresponding to a PRACH slot.

Figure 7:
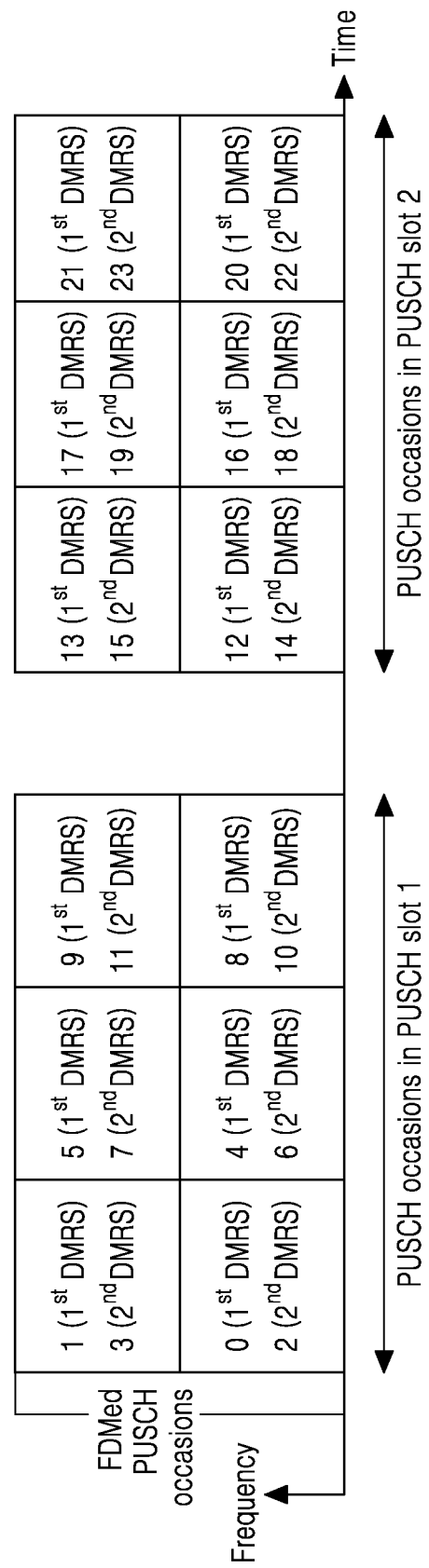
FIG. 7 is an illustration for describing the PUSCH occasion indexing according to an embodiment of the disclosure.

FIG. 7 is an illustration for describing the PUSCH occasion indexing according to an embodiment of the disclosure. For example, let's say that for a PRACH slot, there are two PUSCH slot, each PUSCH slot has three PUSCH occasions in time domain and two PUSCH occasions in frequency domain. Each PUSCH occasion has two DMRS resource with index 0 and 1. PUSCH occasion indexing according to this embodiment is illustrated in FIG. 7. Since there are two DMRS resources for each PUSCH occasion, there are two PUSCH occasion index assigned to a PUSCH occasion, each corresponding to different DMRS resource in that PUSCH occasion.

Referring to FIG. 7, in an embodiment, the indexing mechanism can be applied across PUSCH occasions of PRACH slots in an association pattern period.

In an embodiment, DMRS sequence/port/index to be used can also be signaled (separate for each SSB/CSI-RS or common for all). Alternatively, DMRS sequence/port/index to be used for CFRA PUSCH resource can be pre-defined. DMRS index is determined first in an ascending order of a DMRS port index and second in an ascending order of a DMRS sequence index.

PUSCH Occasion Selection for 2 step CFRA based on SSB:

UE first select SSB where selected SSB is the one for which SS-RSRP is above a configured threshold (threshold is signaled by gNB).

UE select preamble (indicated by ra-PreambleIndex) corresponding to selected SSB UE then select RO corresponding to selected SSB (note that ROs are mapped to SSBs as defined earlier and UE select one of ROs mapped to selected SSB).

UE then select PUSCH occasion indicated by puschOccasionIndex corresponding to selected SSB from PUSCH occasions corresponding to PRACH slot of selected RO. Note that UE has selected RO corresponding to selected SSB. This RO belongs to a PRACH slot. For a PRACH slot there are several PUSCH occasions as explained earlier.

Figure 8:
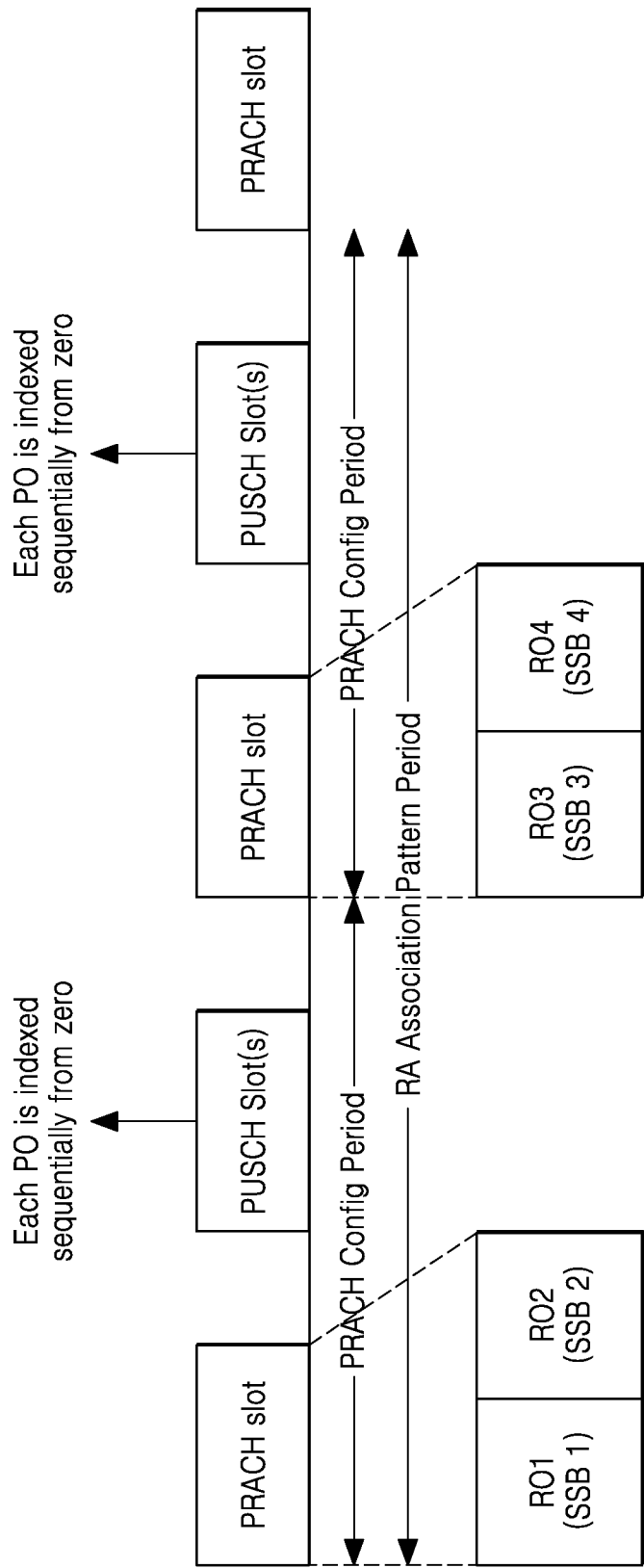
FIG. 8 is an illustration for describing the PUSCH Occasion Selection for 2 step contention free random access (CFRA) based on SSB according to an embodiment of the disclosure.

FIG. 8 is an illustration for describing the PUSCH Occasion Selection for 2 step CFRA based on SSB according to an embodiment of the disclosure.

Referring to FIG. 8, if UE select RO1 for SSB1, PUSCH occasion indicated in rach config dedicated corresponding to SSB1 is selected from the PUSCH occasions corresponding to PRACH slot of RO1.

UE than transmit selected preamble and MsgA MAC PDU in selected PRACH occasion and PUSCH occasion respectively PUSCH Occasion Selection for 2 step CFRA based on CSI-RS:

UE first select CSI-RS where selected CSI-RS is the one for which CSI-RSRP is above a configured threshold (threshold is signaled by gNB).

UE select preamble (indicated by ra-PreambleIndex) corresponding to selected CSI-RS UE then select RO (indicated by ra-OccasionList) corresponding to selected CSI-RS UE then select PUSCH occasion indicated by puschOccasionIndexList corresponding to selected CSI-RS UE than transmit selected preamble and MsgA MAC PDU in selected PRACH occasion and PUSCH occasion respectively Second Embodiment PUSCH Resource Signaling: In an embodiment it is proposed that PUSCH Resource configuration for 2 step CFRA is separately configured from PUSCH Resource configuration for 2 step CBRA.

For the PUSCH resource configuration for 2 step CBRA, msgA-PUSCH-ResourceList is included in common configuration of BWP. It is a list of MsgA-PUSCH-Resource. MsgA-PUSCH-Resource IE includes PUSCH parameters to determine PUSCH occasions. If 2 step RA is supported in a BWP and msgA-PUSCH-ResourceList is not included in common configuration of that BWP, msgA-PUSCH-ResourceList from initial BWP is used.

For the 2 step CFRA configuration, msgA-PUSCH-Resource-CFRA is included in RACH-ConfigDedicated IE of RRC Reconfiguration message. msgA-PUSCH-Resource-CFRA applies to BWP indicated by parameter first active uplink BWP. msgA-PUSCH-Resource-CFRA includes PUSCH parameters to determine PUSCH occasions. MCS/number of PRBs for each PUSCH occasion is part of msgA-PUSCH-Resource-CFRA MsgA-PUSCH-Resource/msgA-PUSCH-Resource-CFRA parameters:

frequencyStartMsgAPUSCH: UE determines first RB for a first PUSCH occasion in an UL BWP from frequencyStartMsgAPUSCH that provides an offset, in number of RBs in the UL BWP, from a first RB of the UL BWP.

nrofPRBsperMsgAPO: A PUSCH occasion includes a number of RBs provided by nrofPRBsperMsgAPO.

guardBandMsgAPUSCH: Consecutive PUSCH occasions in the frequency domain of an UL BWP are separated by a number of RBs provided by guardBandMsgAPUSCH.

nrMsgAPO-FDM: A number of PUSCH occasions in the frequency domain of an UL BWP is provided by nrMsgAPO-FDM.

msgAPUSCH-timeDomainOffset: UE determines a first slot for a first PUSCH occasion in an UL BWP from msgAPUSCH-timeDomainOffset that provides an offset, in number of slots in the UL BWP, relative to the start of each PRACH slot.

guardPeriodMsgAPUSCH: Consecutive PUSCH occasions within each slot are separated by guardPeriodMsgAPUSCH symbols and have same duration.

nrofMsgAPOperSlot: A number $N_t$ of time domain PUSCH occasions in each slot is provided by nrofMsgAPOperSlot, nrofSlotsMsgAPUSCH: A number of consecutive slots that include PUSCH occasions is provided by nrofSlotsMsgAPUSCH.

startSymbolAndLengthMsgAPO: Starting symbol and length of PUSCH occasion in a PUSCH slot is given by startSymbolAndLengthMsgAPO msgA-DMRS-Configuration: A UE is provided a DMRS configuration for a PUSCH transmission in a PUSCH occasion in an active UL BWP by msgA-DMRS-Configuration.

msgA-MCS: A UE is provided an MCS for data information in a PUSCH transmission for a PUSCH occasion by msgA-MCS.

FIG. 3 is an example illustration of these parameters for indicating PUSCH resources with respect to PRACH slot.

If msgA-PUSCH-Resource-CFRA is not signaled by GNB for 2 step CFRA:

UE uses MsgA-PUSCH-Resource from msgA-PUSCH-ResourceList configured for 2 step CBRA. In case msgA-PUSCH-ResourceList includes both group A and group PUSCH resources:

UE can use PUSCH Resource configuration corresponding to group A from configuration for 2 step CBRA; or UE can use PUSCH Resource configuration corresponding to group B from configuration for 2 step CBRA; or The PUSCH Resource configuration (group A or group B) to be used from configuration for 2 step CBRA is indicated in 2 step CFRA configuration or UE can select PUSCH Resource configuration corresponding to group A or group B based on MsgA MAC PDU size For example, if the potential MSGA payload size (UL data available for transmission plus MAC header and, where required, MAC CEs) is greater than group A MsgA size and the pathloss is less than PCMAX (of the Serving Cell performing the Random Access Procedure)−preambleReceivedTargetPower−msgA-DeltaPreamble−messagePower-OffSetGroupB: select group B. Otherwise, select the group A.

In an embodiment, it is proposed that for 2 step CFRA, in RACH-ConfigDedicated, RA preamble index is signaled for one or more SSBs/CSI RSs. In an embodiment rach-ConfigGeneric2step (to provide ROs which are different from 2 step CBRA) can also be signaled in RACH-ConfigDedicated. In an embodiment msgA-SSB-sharedRO-MaskIndex can also be signaled (in RACH-ConfigDedicated, note that msgA-SSB-sharedRO-MaskIndex is configured separately for 2 step CBRA and 2 step CFRA) in case ROs for 2 step CFRA are shared with 4 step and indicated which of the 4 step ROs are shared with 2 step CFRA. For an SSB, there can be several ROs and msgA-SSB-sharedRO-MaskIndex is used to indicated a subset of these ROs. FIG. 5 is an example illustration. pusch-OccasionIndexList indicates PUSCH occasion index for each RO in ra-OccasionList. Ith entry in pusch-OccasionIndexList corresponds to ith entry in ra-OccasionList. In an embodiment, instead of pusch-OccasionIndexList for CSI-RS, one PUSCH occasion index can be there.

PRACH occasions/preambles mapping to PUSCH occasions:

Embodiment 2-1

In an embodiment, the PRACH occasions/preambles for 2 step contention free random access resources are mapped to PUSCH occasions as follows:

Contention free preambles (assigned by gNB to UE) from valid PRACH occasions (i.e. valid PRACH occasions corresponding to SSBs/CSI-RSs for which contention free random access resources are provided) in a PRACH slot
- first, in increasing order of preamble indexes (each assigned contention free preamble in a PRACH occasion is sequentially indexed) within a single PRACH occasion
- second, in increasing order of frequency resource indexes for frequency multiplexed PRACH occasions
- third, in increasing order of time resource indexes for time multiplexed PRACH occasions within a PRACH slot are mapped to a valid PUSCH occasion
- first, in increasing order of frequency resource indexes for frequency multiplexed PUSCH occasions
- second, in increasing order of time resource indexes for time multiplexed PUSCH occasions within a PUSCH slot

TABLE 2

```
RACH-ConfigDedicated ::=      SEQUENCE {
    cfra-TwoStep-r16          CFRA-2STEP
}
CFRA-2STEP ::=                SEQUENCE {
occasions               SEQUENCE {
        rach-ConfigGeneric2step       RACH-ConfigGeneric,
        ssb-perRACH-Occasion    ENUMERATED {oneEighth, oneFourth, oneHalf,
one, two, four, eight, sixteen}
                OPTIONAL -- Cond SSB-CFRA
    }
msgA-PUSCH-Resource-CFRA       Msg A-PUSCH-Resource-r16
msgA-SSB-sharedRO-MaskIndex-r16            INTEGER (1..15)
resources           CHOICE {
    ssb             SEQUENCE {
        ssb-ResourceList        SEQUENCE (SIZE(1..maxRA-SSB-Resources))
OF CFRA-SSB-Resource,
        ra-ssb-OccasionMaskIndex      INTEGER (0.. 15)
    },
    csirs           SEQUENCE {
        csirs-ResourceList       SEQUENCE (SIZE(1..maxRA-CSIRS-
Resources)) OF CFRA-CSIRS-Resource,
        rsrp-ThresholdCSI-RS       RSRP-Range
    }
   },
}
CFRA-SSB-Resource ::=     SEQUENCE {
   ssb              SSB-Index,
   ra-PreambleIndex         INTEGER (0..63),
   . . .
}
CFRA-CSIRS-Resource ::=      SEQUENCE {
   csi-RS           CSI-RS-Index,
   ra-OccasionList          SEQUENCE (SIZE(1..maxRA-OccasionsPerCSIRS))
OF INTEGER (0..maxRA-Occasions-1),
   ra-PreambleIndex         INTEGER (0..63),
   . . .
}
-- TAG-RACH-CONFIGDEDICATED-STOP
-- ASN1STOP
``` third, in increasing order of indexes for PUSCH slots corresponding to this PRACH slot PRACH occasions validity as specified in TS 38.213 is as follows: For paired spectrum all PRACH occasions are valid. For unpaired spectrum, if a UE is not provided tdd-UL-DL-ConfigurationCommon, a PRACH occasion in a PRACH slot is valid if it does not precede a SS/PBCH block in the PRACH slot and starts at least $N_{gap}$ symbols after a last SS/PBCH block reception symbol, where $N_{gap}$ is zero for preamble SCS of 1.25 KHz/5 KHz, is 2 for preamble SCS of 15/30/60/120 KHz. If a UE is provided tdd-UL-DL-ConfigurationCommon, a PRACH occasion in a PRACH slot is valid if it is within UL symbols, or it does not precede a SS/PBCH block in the PRACH slot and starts at least $N_{gap}$ symbols after a last downlink symbol and at least $N_{gap}$ symbols after a last SS/PBCH block transmission symbol, where $N_{gap}$ is zero for preamble SCS of 1.25 KHz/5 KHz, is 2 for preamble SCS of 15/30/60/120 KHz.

PUSCH occasions validity as specified in TS 38.213 is as follows: A PUSCH occasion is valid if it does not overlap in time and frequency with any PRACH occasion associated with either a 4 step RA or a 2 step RA. Additionally, if a UE is provided tdd-UL-DL-ConfigurationCommon, a PUSCH occasion is valid if it is within UL symbols, or it does not precede a SS/PBCH block in the PUSCH slot and starts at least $N_{gap}$ symbols after a last downlink symbol and at least $N_{gap}$ symbols after a last SS/PBCH block symbol, where $N_{gap}$ is zero for preamble SCS of 1.25 KHz/5 KHz, is 2 for preamble SCS of 15/30/60/120 KHz.

Figure 9:
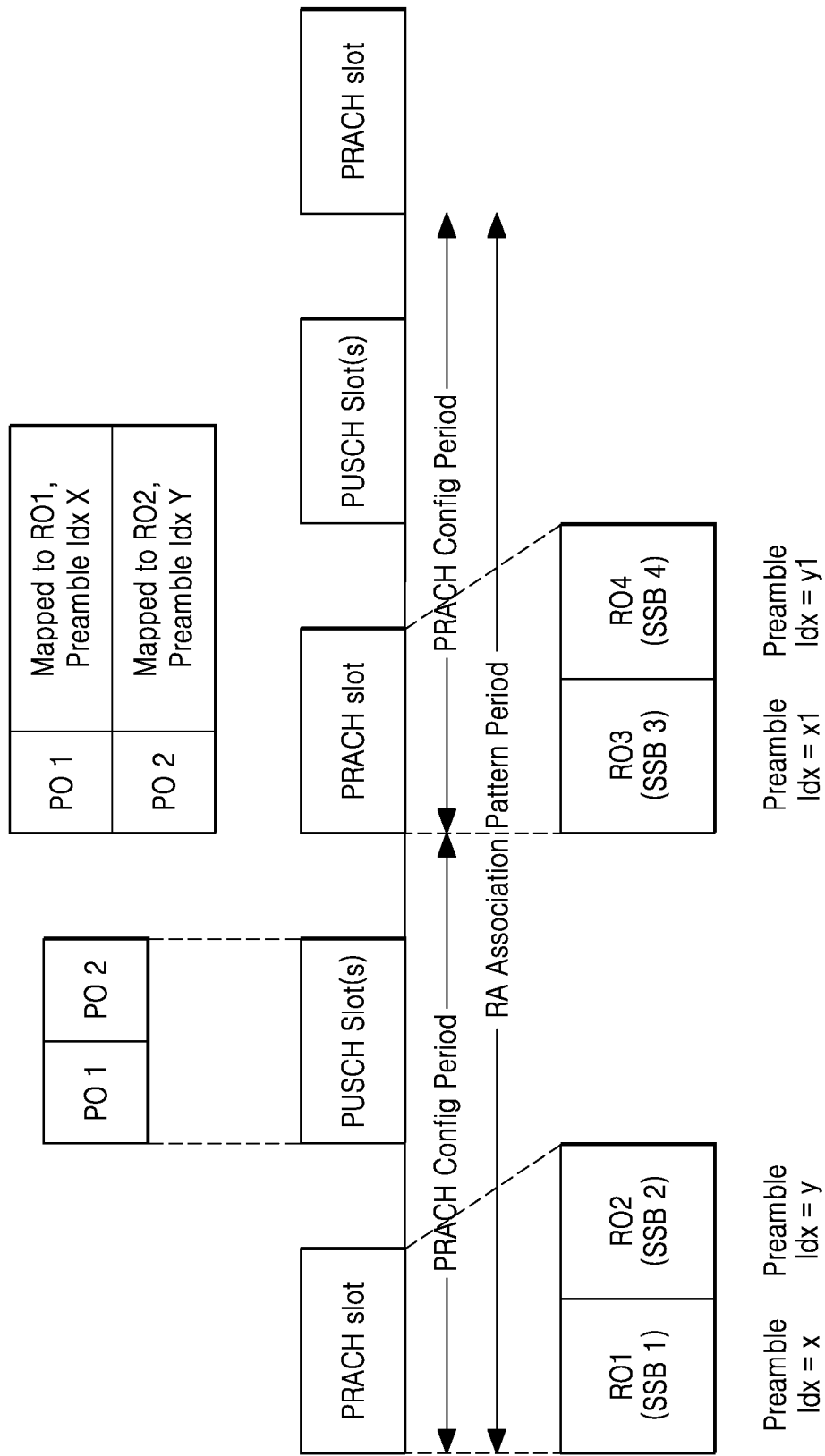
FIG. 9 is an illustration for describing the mapping of PRACH occasion/preamble to PUSCH occasion according to an embodiment of the disclosure.

FIG. 9 is an illustration for describing the mapping of PRACH occasion/preamble to PUSCH occasion according to an embodiment of the disclosure.

For example, let's say there are four transmitted SSBs in a cell. Each SSB is mapped to one RO as shown in FIG. 9. UE is provided 2 step contention free random access resources for all SSBs. Let's say preamble X is provided for SSB1, preamble Y is provided for SSB2, preamble X1 is provided for SSB3 and preamble Y1 is provided for SSB4. In this case contention free RACH occasions are RO1 to RO4 in association pattern period. There are two PUSCH occasion in PUSCH slots corresponding to each PRACH slot.

Figure 10:
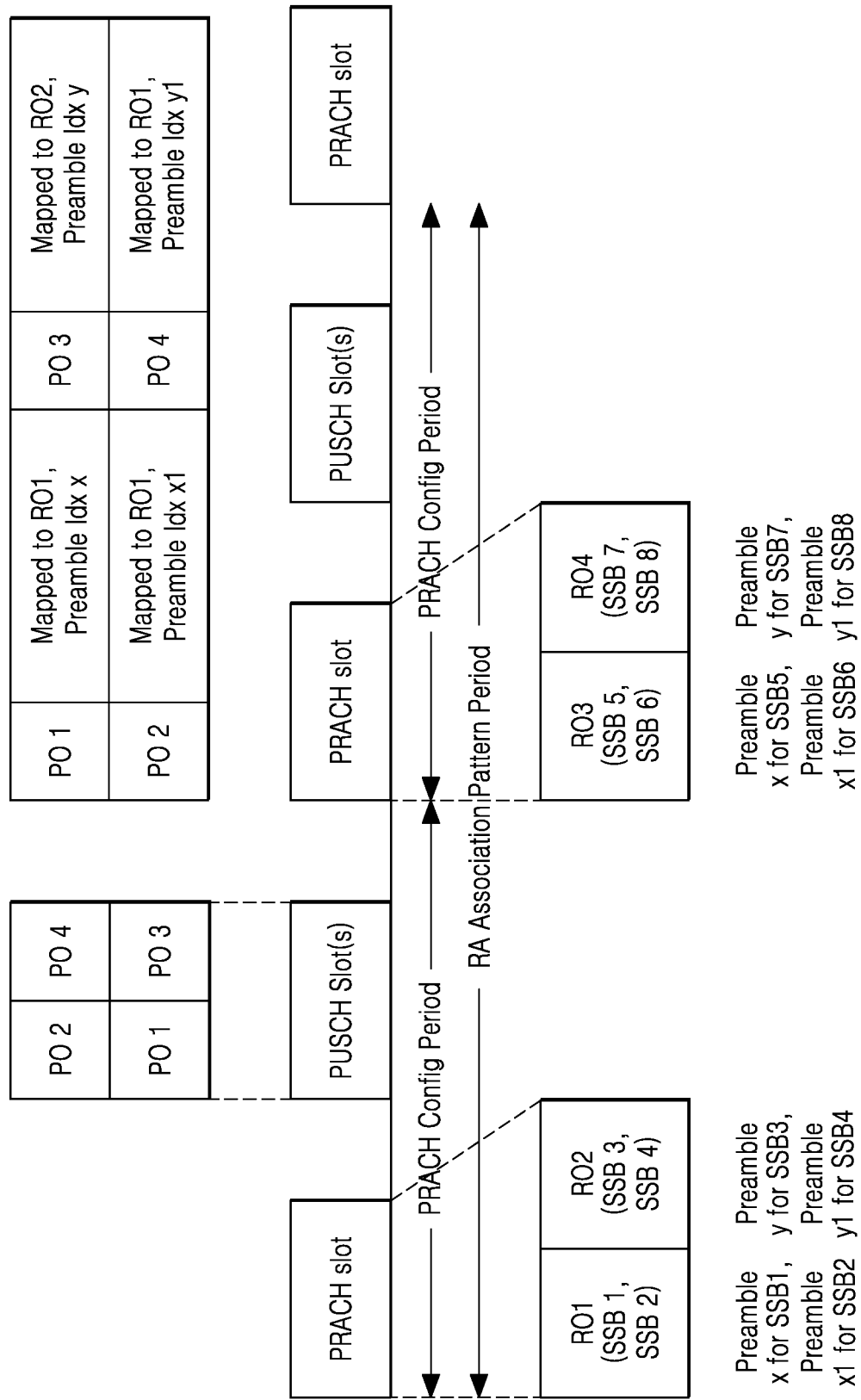
FIG. 10 is another illustration for case where multiple SSBs are mapped to a PUSCH occasion according to an embodiment of the disclosure.

FIG. 10 is another illustration for case where multiple SSBs are mapped to a PUSCH occasion according to an embodiment of the disclosure.

For example, two SSBs are mapped to one RO as shown in FIG. 10. Preamble X is provided for SSB1, preamble X1 is provided for SSB2, preamble Y is provided for SSB3, preamble Y1 is provided for SSB4, preamble X is provided for SSB5, preamble X1 is provided for SSB6, preamble Y is provided for SSB1, and preamble Y1 is provided for SSB8. In this case, there are four PUSCH occasion in PUSCH slots corresponding to each PRACH slot.

Embodiment 2-2

In another embodiment, the PRACH occasions/preambles for 2 step contention free random access resources are mapped to PUSCH occasions as follows:

Contention free preambles (assigned by gNB to UE) from valid PRACH occasions (i.e. valid PRACH occasions corresponding to SSBs/CSI-RSs for which contention free random access resources are provided) in a PRACH slot:

first, in increasing order of preamble indexes (each assigned contention free preamble in a PRACH occasion is sequentially indexed) within a single PRACH occasion second, in increasing order of frequency resource indexes for frequency multiplexed PRACH occasions third, in increasing order of time resource indexes for time multiplexed PRACH occasions within a PRACH slot are mapped to a valid PUSCH occasion first, in increasing order of frequency resource indexes $f_{id}$ for frequency multiplexed PUSCH occasions second, in increasing order of DMRS indexes within a PUSCH occasion, where a DMRS index $DMRS_{id}$ is determined first in an ascending order of a DMRS port index and second in an ascending order of a DMRS sequence index third, in increasing order of time resource indexes $t_{id}$ for time multiplexed PUSCH occasions within a PUSCH slot fourth, in increasing order of indexes for PUSCH slots corresponding to this PRACH slot PRACH occasions validity as specified in TS 38.213 is as follows: For paired spectrum all PRACH occasions are valid. For unpaired spectrum, if a UE is not provided tdd-UL-DL-ConfigurationCommon, a PRACH occasion in a PRACH slot is valid if it does not precede a SS/PBCH block in the PRACH slot and starts at least $N_{gap}$ symbols after a last SS/PBCH block reception symbol, where $N_{gap}$ is zero for preamble SCS of 1.25 KHz/5 KHz, is 2 for preamble SCS of 15/30/60/120 KHz. If a UE is provided tdd-UL-DL-ConfigurationCommon, a PRACH occasion in a PRACH slot is valid if it is within UL symbols, or it does not precede a SS/PBCH block in the PRACH slot and starts at least $N_{gap}$ symbols after a last downlink symbol and at least $N_{gap}$ symbols after a last SS/PBCH block transmission symbol, where $N_{gap}$ is zero for preamble SCS of 1.25 KHz/5 KHz, is 2 for preamble SCS of 15/30/60/120 KHz.

PUSCH occasions validity as specified in TS 38.213 is as follows: A PUSCH occasion is valid if it does not overlap in time and frequency with any PRACH occasion associated with either a 4 step RA or a 2 step RA. Additionally, if a UE is provided tdd-UL-DL-ConfigurationCommon, a PUSCH occasion is valid if it is within UL symbols, or it does not precede a SS/PBCH block in the PUSCH slot and starts at least $N_{gap}$ symbols after a last downlink symbol and at least $N_{gap}$ symbols after a last SS/PBCH block symbol, where $N_{gap}$ is zero for preamble SCS of 1.25 KHz/5 KHz, is 2 for preamble SCS of 15/30/60/120 KHz.

Embodiment 2-3

In an embodiment, the PRACH occasions/preambles for 2 step contention free random access resources are mapped to PUSCH occasions as follows:

A consecutive number of $N_{preamble}$ contention free preamble indexes from valid PRACH occasions (i.e. valid PRACH occasions corresponding to SSBs/CSI-RSs for which contention free random access resources are provided) in a PRACH slot first, in increasing order of preamble indexes (each assigned contention free preamble in a PRACH occasion is sequentially indexed) within a single PRACH occasion second, in increasing order of frequency resource indexes for frequency multiplexed PRACH occasions third, in increasing order of time resource indexes for time multiplexed PRACH occasions within a PRACH slot are mapped to a valid PUSCH occasion first, in increasing order of frequency resource indexes $f_{id}$ for frequency multiplexed PUSCH occasions second, in increasing order of DMRS indexes within a PUSCH occasion, where a DMRS index $DMRS_{id}$ is determined first in an ascending order of a DMRS port index and second in an ascending order of a DMRS sequence index third, in increasing order of time resource indexes $t_{id}$ for time multiplexed PUSCH occasions within a PUSCH slot fourth, in increasing order of indexes for PUSCH slots corresponding to this PRACH slot where $N_{preamble}=\text{ceil}(T_{preamble}/T_{PUSCH})$, $T_{preamble}$ is a total number of preambles in valid PRACH occasions (i.e. valid PRACH occasions corresponding to SSBs/CSI-RSs for which contention free random access resources are provided) per association pattern period, and $T_{PUSCH}$ is a total number of valid sets of PUSCH occasions per association pattern period multiplied by the number of DMRS indexes per valid PUSCH occasion.

Embodiment 2-4

In an embodiment, the PRACH occasions/preambles for 2 step contention free random access resources are mapped to PUSCH occasions as follows:

gNB indicates the set of contention free preambles it uses in PRACH occasions. Note that ra-PreambleIndex(s) assigned to UE for SSBs/CSI RSs belongs to this set.

A consecutive number of $N_{preamble}$ contention free preamble indexes from valid PRACH occasions in a PRACH slot first, in increasing order of preamble indexes within a single PRACH occasion second, in increasing order of frequency resource indexes for frequency multiplexed PRACH occasions third, in increasing order of time resource indexes for time multiplexed PRACH occasions within a PRACH slot are mapped to a valid PUSCH occasion first, in increasing order of frequency resource indexes $f_{id}$ for frequency multiplexed PUSCH occasions second, in increasing order of DMRS indexes within a PUSCH occasion, where a DMRS index $DMRS_{id}$ is determined first in an ascending order of a DMRS port index and second in an ascending order of a DMRS sequence index third, in increasing order of time resource indexes $t_{id}$ for time multiplexed PUSCH occasions within a PUSCH slot fourth, in increasing order of indexes for PUSCH slots corresponding to this PRACH slot where $N_{preamble}=\text{ceil}(T_{preamble}/T_{PUSCH})$, $T_{preamble}$ is a total number of contention free preambles in valid PRACH occasions per association pattern period, and $T_{PUSCH}$ is a total number of valid sets of PUSCH occasions per association pattern period multiplied by the number of DMRS indexes per valid PUSCH occasion.

PUSCH Occasion Selection for 2 step CFRA based on SSB:

UE first select SSB where selected SSB is the one for which SS-RSRP is above a configured threshold (threshold is signaled by gNB).

UE select preamble (indicated by ra-PreambleIndex) corresponding to selected SSB UE then select RO corresponding to selected SSB as specified in TS 38.321 (note that ROs are mapped to SSBs as defined earlier and UE select one of ROs mapped to selected SSB).

UE then select PUSCH occasion from PUSCH occasions corresponding to PRACH slot of selected RO. UE select the PUSCH occasion corresponding to selected RO and preamble.

UE than transmit selected preamble and MsgA MAC PDU in selected PRACH occasion and PUSCH occasion respectively PUSCH Occasion Selection for 2 step CFRA based on CSI-RS:

UE first select CSI-RS where selected CSI-RS is the one for which CSI-RSRP is above a configured threshold (threshold is signaled by gNB).

UE select preamble (indicated by ra-PreambleIndex) corresponding to selected CSI-RS UE then select RO (indicated by ra-OccasionList) corresponding to selected CSI-RS as specified in TS 38.321 (note that ROs are mapped to SSBs as defined earlier and UE select one of ROs mapped to selected SSB).

UE then select PUSCH occasion from PUSCH occasions corresponding to PRACH slot of selected RO. UE select the PUSCH occasion corresponding to selected RO and preamble.

UE than transmit selected preamble and MsgA MAC PDU in selected PRACH occasion and PUSCH occasion respectively.

Figure 11:
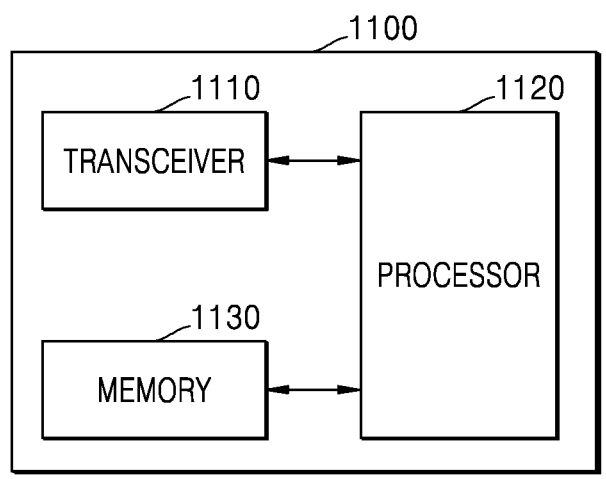
FIG. 11 is a diagram illustrating a UE according to an embodiment of the disclosure.

FIG. 11 is a diagram illustrating a UE according to an embodiment of the disclosure.

Referring to the FIG. 11, the UE 1100 may include a transceiver 1110, a processor 1120 and a memory 1130. However, all of the illustrated components are not essential. The UE 1100 may be implemented by more or less components than those illustrated in the FIG. 8. In addition, the transceiver 1110 and the processor 1120 and the memory 1130 may be implemented as a single chip according to another embodiment.

The aforementioned components will now be described in detail.

The transceiver 1110 may include a RF transmitter for up-converting and amplifying a transmitted signal, and a RF receiver for down-converting a frequency of a received signal. However, according to another embodiment, the transceiver 1110 may be implemented by more or less components than those illustrated in components. The transceiver 1110 may be connected to the processor 1120 and transmit and/or receive a signal. The signal may include control information and data. In addition, the transceiver 1110 may receive the signal through a wireless channel and output the signal to the processor 1120. The transceiver 1110 may transmit a signal output from the processor 1120 through the wireless channel.

The processor 1120 may include one or more processors or other processing devices that control the proposed function, process, and/or method. Operation of the UE 1100 may be implemented by the processor 1120.

The processor 1120 may receive, via the transceiver, RACH configuration information from a base station. In case that a type of a random access is identified as 2-step contention free based on the RACH configuration information, the processor 1120 may select a synchronization signal block (SSB) with synchronization signal-reference signal received power (SS-RSRP) above a configured threshold among SSBs. The processor 1120 may identify a random access occasion corresponding to the selected SSB. The processor 1120 may identify a physical uplink shared channel (PUSCH) occasion corresponding to a RACH slot of the selected random access occasion from PUSCH occasions configured based on PUSCH resource configuration information included in the RACH configuration information. The processor 1120 may perform msgA transmission based on the identified random access occasion and the identified PUSCH occasion.

The memory 1130 may store the control information or the data included in a signal obtained by the UE 1100. The memory 1130 may be connected to the processor 1120 and store at least one instruction or a protocol or a parameter for the proposed function, process, and/or method. The memory 1130 may include read-only memory (ROM) and/or random access memory (RAM) and/or hard disk and/or CD-ROM and/or DVD and/or other storage devices.

Figure 12:
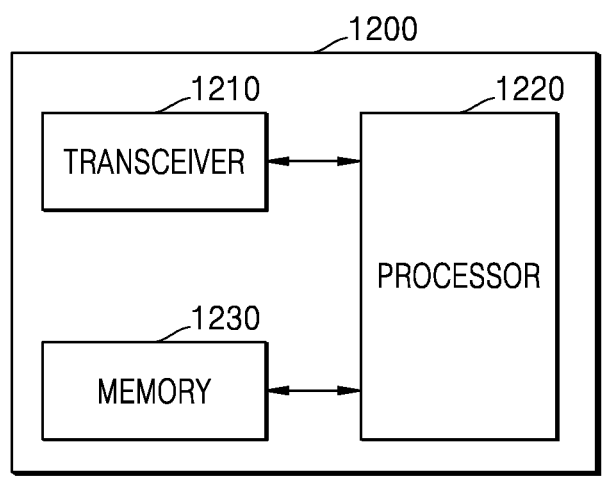
FIG. 12 is a diagram illustrating a base station according to an embodiment of the disclosure.

FIG. 12 is a diagram illustrating a base station according to an embodiment of the disclosure.

Referring to the FIG. 12, the base station 1200 may include a transceiver 1210, a processor 1220 and a memory 1230. However, all of the illustrated components are not essential. The base station 1200 may be implemented by more or less components than those illustrated in the FIG. 12. In addition, the transceiver 1210, the processor 1220 and the memory 1230 may be implemented as a single chip according to another embodiment.

The aforementioned components will now be described in detail.

The transceiver 1210 may include a RF transmitter for up-converting and amplifying a transmitted signal, and a RF receiver for down-converting a frequency of a received signal. However, according to another embodiment, the transceiver 1210 may be implemented by more or less components than those illustrated in components. The transceiver 1210 may be connected to the processor 1220 and transmit and/or receive a signal. The signal may include control information and data. In addition, the transceiver 1210 may receive the signal through a wireless channel and output the signal to the processor 1220. The transceiver 1210 may transmit a signal output from the processor 1220 through the wireless channel.

The processor 1220 may include one or more processors or other processing devices that control the proposed function, process, and/or method. Operation of the base station 1200 may be implemented by the processor 1220.

The processor 1220 may transmit, via the transceiver, random access channel (RACH) configuration information to the UE. The processor 1220 may receive, via the transceiver, msgA based on random access occasion and PUSCH occasion identified based on the RACH configuration information.

The memory 1230 may store the control information or the data included in a signal obtained by the base station 1200. The memory 1230 may be connected to the processor 1220 and store at least one instruction or a protocol or a parameter for the proposed function, process, and/or method. The memory 1230 may include read-only memory (ROM) and/or random access memory (RAM) and/or hard disk and/or CD-ROM and/or DVD and/or other storage devices.

At least some of the example embodiments described herein may be constructed, partially or wholly, using dedicated special-purpose hardware. Terms such as 'component', 'module' or 'unit' used herein may include, but are not limited to, a hardware device, such as circuitry in the form of discrete or integrated components, a Field Programmable Gate Array (FPGA) or Application Specific Integrated Circuit (ASIC), which performs certain tasks or provides the associated functionality. In some embodiments, the described elements may be configured to reside on a tangible, persistent, addressable storage medium and may be configured to execute on one or more processors. These functional elements may in some embodiments include, by way of example, components, such as software components, object-oriented software components, class components and task components, processes, functions, attributes, procedures, subroutines, segments of program code, drivers, firmware, microcode, circuitry, data, databases, data structures, tables, arrays, and variables. Although the example embodiments have been described with reference to the components, modules and units discussed herein, such functional elements may be combined into fewer elements or separated into additional elements. Various combinations of optional features have been described herein, and it will be appreciated that described features may be combined in any suitable combination. In particular, the features of any one example embodiment may be combined with features of any other embodiment, as appropriate, except where such combinations are mutually exclusive. Throughout this specification, the term "comprising" or "comprises" means including the component(s) specified but not to the exclusion of the presence of others.

Attention is directed to all papers and documents which are filed concurrently with or previous to this specification in connection with this application and which are open to public inspection with this specification, and the contents of all such papers and documents are incorporated herein by reference.

All of the features disclosed in this specification (including any accompanying claims, abstract and drawings), and/or all of the steps of any method or process so disclosed, may be combined in any combination, except combinations where at least some of such features and/or steps are mutually exclusive.

Each feature disclosed in this specification (including any accompanying claims, abstract and drawings) may be replaced by alternative features serving the same, equivalent or similar purpose, unless expressly stated otherwise. Thus, unless expressly stated otherwise, each feature disclosed is one example only of a generic series of equivalent or similar features.

The disclosure is not restricted to the details of the foregoing embodiment(s). The disclosure extends to any novel one, or any novel combination, of the features disclosed in this specification (including any accompanying claims, abstract and drawings), or to any novel one, or any novel combination, of the steps of any method or process so disclosed.

While the disclosure has been shown and described with reference to various embodiments thereof, it will be understood by those skilled in the art that various changes in form and details may be made therein without departing from the spirit and scope of the disclosure as defined by the appended claims and their equivalents.

What is claimed is:

1. A user equipment (UE), the UE comprising:
   a transceiver; and
   a processor configured to:
   receive, via the transceiver, random access channel (RACH) configuration information including CFRA-SSB-Resource information and msgA-PUSCH-Resource-CFRA information from a base station (BS), wherein the msgA-PUSCH-Resource-CFRA information includes at least one physical uplink shared channel (PUSCH) occasion, each PUSCH occasion is indexed, and wherein the CFRA-SSB-Resource information includes PUSCH occasion index information indicating an indexed PUSCH occasion, in case that a type of a random access is identified as 2-step contention free random access (CFRA) based on the RACH configuration information, select a synchronization signal block (SSB) with synchronization signal-reference signal received power (SS-RSRP) above a configured threshold among SSBs, identify a random access occasion corresponding to the selected SSB, identify a PUSCH occasion from among the at least one PUSCH occasion configured in the msgA-PUSCH-Resource-CFRA information, according to the PUSCH occasion index information corresponding to the selected SSB, and perform a message A transmission based on the identified random access occasion and the identified PUSCH occasion.

2. The UE of claim 1, wherein the msgA-PUSCH-Resource-CFRA information includes parameters regarding:
a modulation coding scheme (MCS) for the message A transmission,
a number of slots containing the at least one PUSCH occasion,
a number of time domain PUSCH occasions in each RACH slot,
a time offset with respect to a start of each RACH slot,
a start symbol and length of the PUSCH occasion,
a guard period between the at least one PUSCH occasion in a unit of symbols,
a resource block (RB)-level guard band between the at least one PUSCH occasion in a frequency domain,
an offset of a lowest PUSCH occasion in the frequency domain,
a number of RBs per PUSCH occasion,
a number of PUSCH occasions in the frequency domain in one time instance, and
a demodulation reference signal (DMRS) configuration for the at least one PUSCH occasion.

3. The UE of claim 1, wherein at least one PUSCH occasion index is sequentially indexed and is mapped to the at least one PUSCH occasion corresponding to a RACH slot of the identified random access occasion.

4. The UE of claim 3, wherein the at least one PUSCH occasion corresponding to the RACH slot is indexed by ordering:
firstly, in increasing order of frequency resource indexes for frequency multiplexed PUSCH occasions,
secondly, in increasing order of DMRS resource indexes within the PUSCH occasion, where a DMRS resource index is determined first in an ascending order of a DMRS port index and then in an ascending order of a DMRS sequence index,
thirdly, in increasing order of time resource indexes for time multiplexed PUSCH occasions within a PUSCH slot, and
fourthly, in increasing order of indexes for PUSCH slots.

5. The UE of claim 1, wherein the SSBs are identified based on SSB configuration information included in the RACH configuration information and the SSB configuration information includes a SSB index, a random access preamble index and a PUSCH occasion index for a SSB.

6. A base station (BS), the BS comprising:
a transceiver; and
a processor configured to:
transmit, via the transceiver, random access channel (RACH) configuration information including CFRA-SSB-Resource information and msgA-PUSCH-Resource-CFRA information to a user equipment (UE), wherein the msgA-PUSCH-Resource-CFRA information includes at least one physical uplink shared channel (PUSCH) occasion, each PUSCH occasion is indexed, and wherein the CFRA-SSB-Resource information includes PUSCH occasion index information indicating an indexed PUSCH occasion, and
receive, via the transceiver, a message A based on a random access occasion and a PUSCH occasion identified based on the RACH configuration information,
wherein in case that a type of a random access is identified as 2-step contention free random access (CFRA) based on the RACH configuration information;
a synchronization signal block (SSB) with synchronization signal-reference signal received power (SS-RSRP) above a configured threshold among SSBs is selected at the UE,
the random access occasion corresponding to the selected SSB is identified at the UE, and
the PUSCH occasion from among the at least one PUSCH occasion configured in the msgA-PUSCH-Resource-CFRA information is identified at the UE, according to the PUSCH occasion index information corresponding to the selected SSB.

7. The BS of claim 6, wherein the msgA-PUSCH-Resource-CFRA information includes parameters regarding:
a modulation coding scheme (MCS) for the message A transmission on the PUSCH occasion,
a number of slots containing the at least one PUSCH occasion,
a number of time domain PUSCH occasions in each RACH slot,
a time offset with respect to a start of each RACH slot,
a start symbol and length of the PUSCH occasion,
a guard period between the at least one PUSCH occasion in a unit of symbols,
a resource block (RB)-level guard band between the at least one PUSCH occasion in a frequency domain,
an offset of a lowest PUSCH occasion in the frequency domain,
a number of RBs per PUSCH occasion,
a number of PUSCH occasions in the frequency domain in one time instance, and
a demodulation reference signal (DMRS) configuration for the at least one PUSCH occasion.

8. The BS of claim 6, wherein at least one PUSCH occasion index is sequentially indexed and is mapped to the at least one PUSCH occasion corresponding to a RACH slot of the identified random access occasion.

9. The BS of claim 8, wherein the at least one PUSCH occasion corresponding to the RACH slot is indexed by ordering:
firstly, in increasing order of frequency resource indexes for frequency multiplexed PUSCH occasions,
secondly, in increasing order of DMRS resource indexes within the PUSCH occasion, where a DMRS resource index is determined first in an ascending order of a DMRS port index and then in an ascending order of a DMRS sequence index, thirdly, in increasing order of time resource indexes for time multiplexed PUSCH occasions within a PUSCH slot, and fourthly, in increasing order of indexes for PUSCH slots.

10. The BS of claim 6, wherein the SSBs are identified based on SSB configuration information included in the RACH configuration information and the SSB configuration information includes a SSB index, a random access preamble index and a PUSCH occasion index for a SSB.

11. A method of performing communication by a user equipment (UE), the method comprising:
receiving random access channel (RACH) configuration information including CFRA-SSB-Resource information and msgA-PUSCH-Resource-CFRA information from a base station (BS), wherein the msgA-PUSCH-Resource-CFRA information includes at least one physical uplink shared channel (PUSCH) occasion, each PUSCH occasion is indexed, and wherein the CFRA-SSB-Resource information includes PUSCH occasion index information indicating an indexed PUSCH occasion;
in case that a type of a random access is identified as 2-step contention free random access (CFRA) based on the RACH configuration information, selecting a synchronization signal block (SSB) with synchronization signal-reference signal received power (SS-RSRP) above a configured threshold among SSBs;
identifying a random access occasion corresponding to the selected SSB;
identifying a PUSCH occasion from among the at least one PUSCH occasion configured in the msgA-PUSCH-Resource-CFRA information, according to the PUSCH occasion index information corresponding to the selected SSB; and
performing a message A transmission based on the identified random access occasion and the identified PUSCH occasion.

12. The method of claim 11, wherein the msgA-PUSCH-Resource-CFRA information includes parameters regarding:
a modulation coding scheme (MCS) for the message A transmission,
a number of slots containing the at least one PUSCH occasion,
a number of time domain PUSCH occasions in each RACH slot,
a time offset with respect to a start of each RACH slot,
a start symbol and length of the PUSCH occasion,
a guard period between the at least one PUSCH occasion in a unit of symbols,
a resource block (RB)-level guard band between the at least one PUSCH occasion in a frequency domain,
an offset of a lowest PUSCH occasion in the frequency domain,
a number of RBs per PUSCH occasion,
a number of PUSCH occasions in the frequency domain in one time instance, and
a demodulation reference signal (DMRS) configuration for the at least one PUSCH occasion.

13. The method of claim 11, wherein at least one PUSCH occasion index is sequentially indexed and is mapped to the at least one PUSCH occasion corresponding to a RACH slot of the identified random access occasion.

14. The method of claim 13, wherein the at least one PUSCH occasion corresponding to the RACH slot is indexed by ordering:
firstly, in increasing order of frequency resource indexes for frequency multiplexed PUSCH occasions, secondly, in increasing order of DMRS resource indexes within the PUSCH occasion, where a DMRS resource index is determined first in an ascending order of a DMRS port index and then in an ascending order of a DMRS sequence index, thirdly, in increasing order of time resource indexes for time multiplexed PUSCH occasions within a PUSCH slot, and fourthly, in increasing order of indexes for PUSCH slots.

15. The method of claim 11, wherein the SSBs are identified based on SSB configuration information included in the RACH configuration information and the SSB configuration information includes a SSB index, a random access preamble index and a PUSCH occasion index for a SSB.

16. A method of performing communication by a base station (BS), the method comprising:
transmitting random access channel (RACH) configuration information including CFRA-SSB-Resource information and msgA-PUSCH-Resource-CFRA information to a user equipment (UE), wherein the msgA-PUSCH-Resource-CFRA information includes at least one physical uplink shared channel (PUSCH) occasion, each PUSCH occasion is indexed, and wherein the CFRA-SSB-Resource information includes PUSCH occasion index information indicating an indexed PUSCH occasion, and
receiving a message A based on a random access occasion and a PUSCH occasion identified based on the RACH configuration information,
wherein in case that a type of a random access is identified as 2-step contention free random access (CFRA) based on the RACH configuration information;
a synchronization signal block (SSB) with synchronization signal-reference signal received power (SS-RSRP) above a configured threshold among SSBs is selected at the UE,
the random access occasion corresponding to the selected SSB is identified at the UE, and
the PUSCH occasion from among the at least one PUSCH occasion configured in the msgA-PUSCH-Resource-CFRA information is identified at the UE, according to the PUSCH occasion index information corresponding to the selected SSB.

17. The method of claim 16, wherein the msgA-PUSCH-Resource-CFRA information includes parameters regarding:
a modulation coding scheme (MCS) for the message A transmission on the PUSCH occasion,
a number of slots containing the at least one PUSCH occasion,
a number of time domain PUSCH occasions in each RACH slot,
a time offset with respect to a start of each RACH slot,
a start symbol and length of the PUSCH occasion,
a guard period between the at least one PUSCH occasion in a unit of symbols,
a resource block (RB)-level guard band between the at least one PUSCH occasion in a frequency domain,
an offset of a lowest PUSCH occasion in the frequency domain,
a number of RBs per PUSCH occasion,
a number of PUSCH occasions in the frequency domain in one time instance, and
a demodulation reference signal (DMRS) configuration for the at least one PUSCH occasion.

18. The method of claim 16, wherein at least one PUSCH occasion index is sequentially indexed and is mapped to the at least one PUSCH occasion corresponding to a RACH slot of the identified random access occasion.

19. The method of claim 18, wherein the at least one PUSCH occasion corresponding to the RACH slot is indexed by ordering:
- firstly, in increasing order of frequency resource indexes for frequency multiplexed PUSCH occasions,
- secondly, in increasing order of DMRS resource indexes within the PUSCH occasion, where a DMRS resource index is determined first in an ascending order of a DMRS port index and then in an ascending order of a DMRS sequence index,
- thirdly, in increasing order of time resource indexes for time multiplexed PUSCH occasions within a PUSCH slot, and
- fourthly, in increasing order of indexes for PUSCH slots.

20. The method of claim 16, wherein the SSBs are identified based on SSB configuration information included in the RACH configuration information and the SSB configuration information includes a SSB index, a random access preamble index and a PUSCH occasion index for a SSB.

* * * * *